United States Patent [19]

Takahashi

[11] Patent Number: 4,653,872
[45] Date of Patent: Mar. 31, 1987

[54] ATHERMALIZED ZOOM LENS SYSTEM

[75] Inventor: Tomowaki Takahashi, Tokyo, Japan

[73] Assignee: Nippon Kogaku K. K., Tokyo, Japan

[21] Appl. No.: 367,981

[22] Filed: Apr. 13, 1982

[30] Foreign Application Priority Data

Apr. 22, 1981 [JP] Japan .................. 56-59685
Oct. 15, 1981 [JP] Japan .................. 56-164565

[51] Int. Cl.⁴ ............................................. G02B 15/14
[52] U.S. Cl. ......................................................... 350/427
[58] Field of Search ................................ 350/423, 427

[56] References Cited

U.S. PATENT DOCUMENTS 3,920,315 11/1975 Linke ........................ 350/423
3,972,592  5/1976 Ruben ....................... 350/423
4,148,548  4/1979 Thompson ............... 350/423 X
4,469,412  9/1984 Tajima et al. ............ 350/426

FOREIGN PATENT DOCUMENTS 55-143518 11/1980 Japan ..................... 350/423

Primary Examiner—John K. Corbin
Assistant Examiner—Scott J. Sugarman
Attorney, Agent, or Firm—Shapiro and Shapiro

[57] ABSTRACT

A zoom lens system chiefly comprising organic glass lenses includes a plurality of lens groups including movable lens groups capable of changing their relative position to vary the focal length. At least one of the plurality of lens groups has a lens formed of inorganic glass, and all the lenses other than the inorganic glass lens are formed of organic glass. The inorganic glass lens is such that when it is replaced by an organic glass lens, the organic glass lens creates, by zooming, an amount of focus fluctuation corresponding to a variation in focus created in the entire system by zooming between predetermined temperatures, whereby the variation in focus position by zooming resulting from a variation in temperature of the entire system is corrected.

31 Claims, 72 Drawing Figures

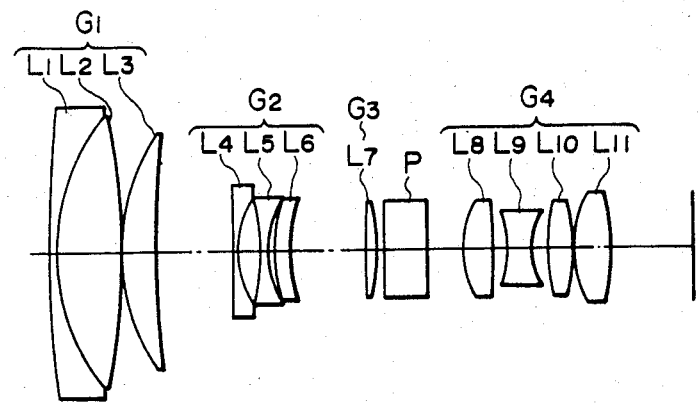
FIG. 1
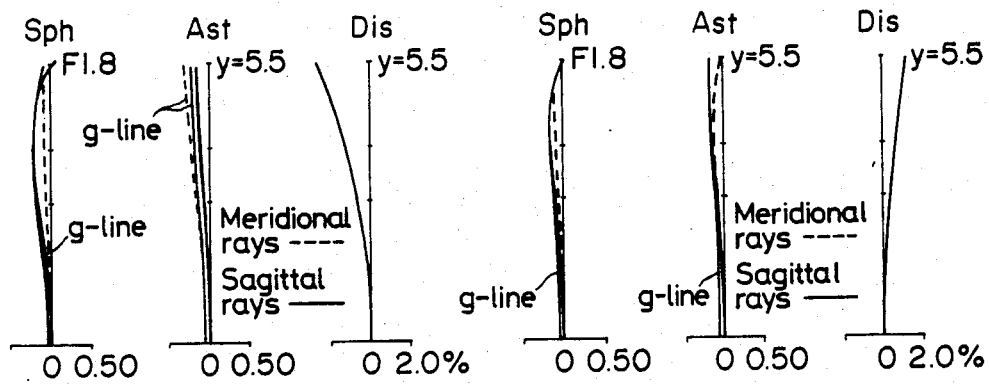
FIG. 2A
FIG. 2B
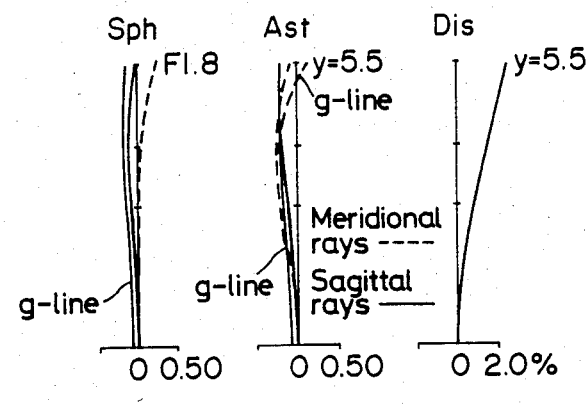
FIG. 2C

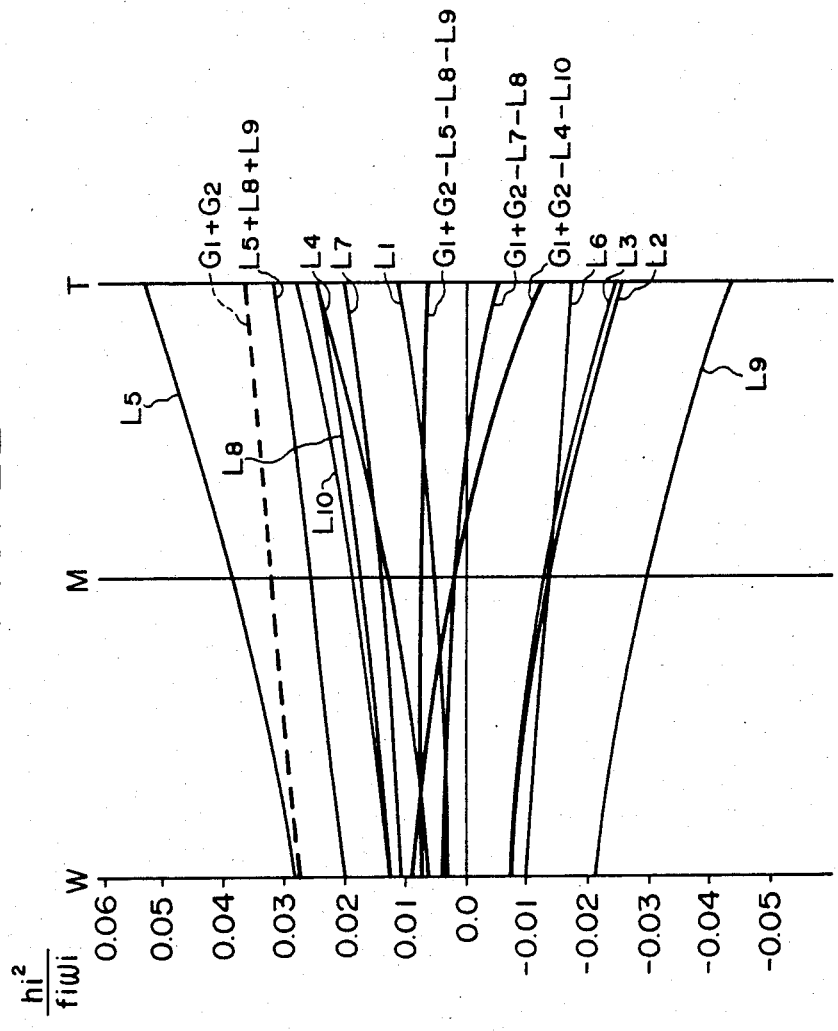

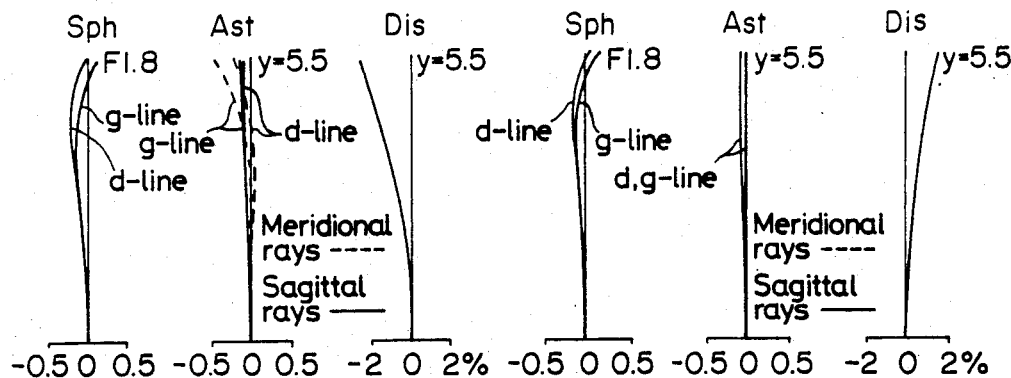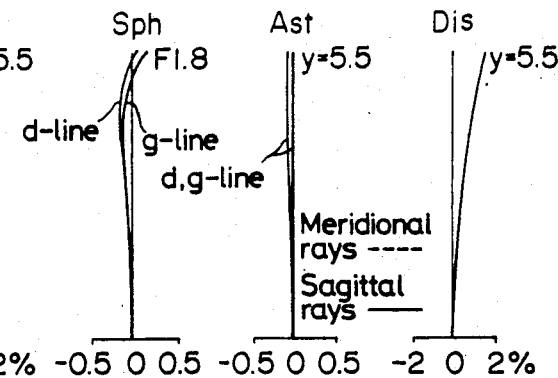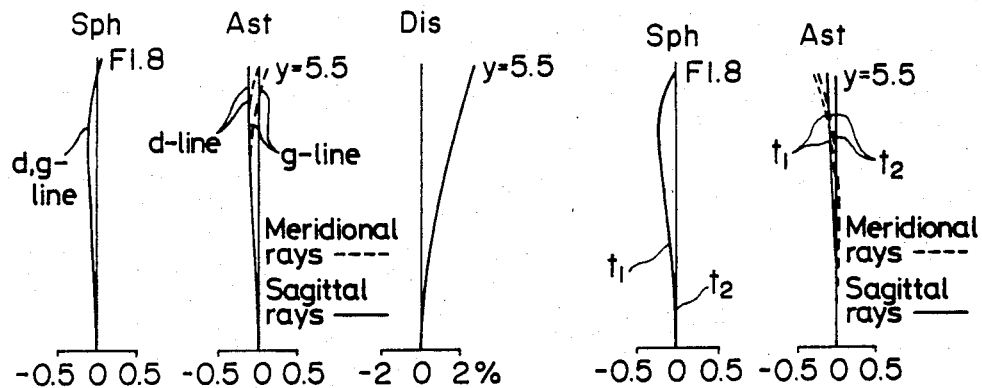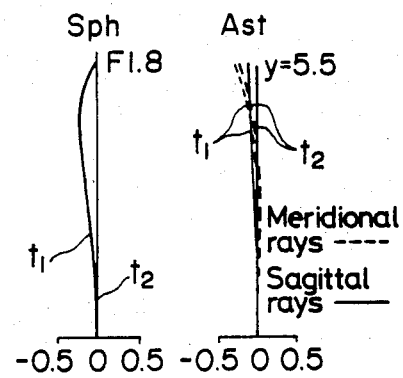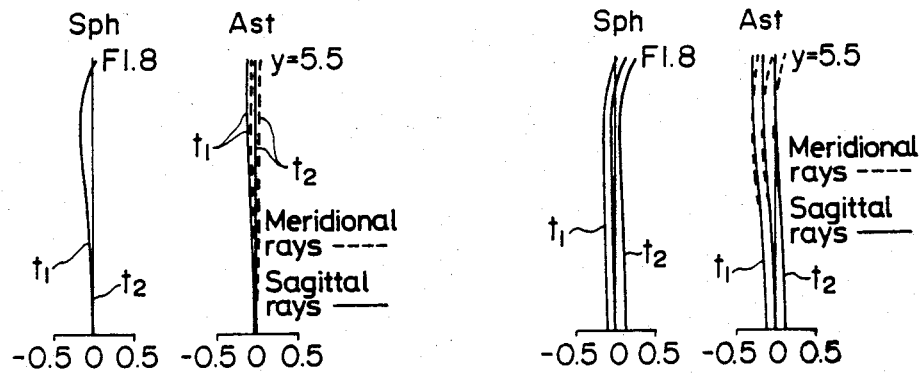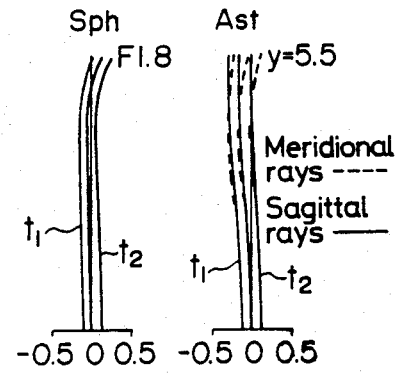

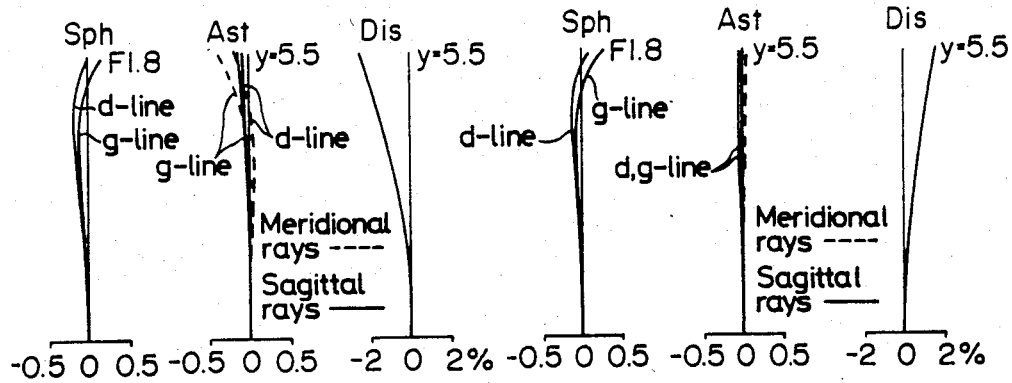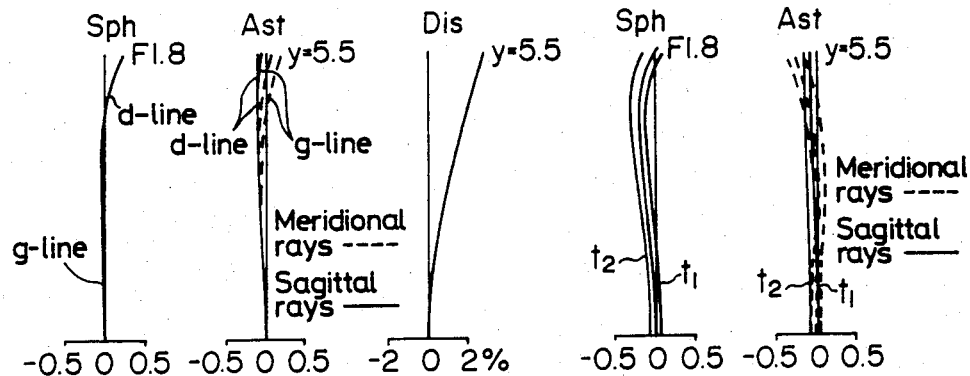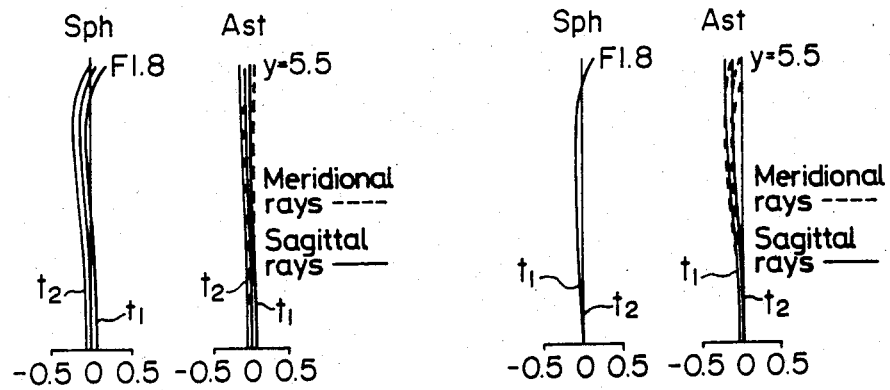

ATHERMALIZED ZOOM LENS SYSTEM

BACKGROUND OF THE INVENTION

1. Field of the Invention

This invention relates to a zoom lens system having chiefly so-called organic glass lenses known as plastic lenses.

2. Description of the Prior Art

In various lens systems, if all lenses as constitutional elements are replaced by by organic glass lenses, called the plastic lenses, the weight of the system will be reduced by ⅓-¼ and by virtue of this great reduction in weight manufacturing cost can be brought about. However, plastics have large expansion coefficients and also have large variations of refractive index with temperature, as compared with inorganic glass, and this has led to the disadvantage that the focal plane of the lens is moved by any variation in temperature.

To overcome such disadvantage, in a fixed focal length lens of triplet construction, a technique of forming one of positive lenses of glass, another positive lens of plastic and a negative lens of high dispersion plastic and thereby negating any temperature variation while correcting chromatic aberration is known from Japanese Laid-open Patent Application No. 143518/1980.

In this Japanese Laid-open Patent Application No. 143518/1980, for a fixed focus lens system comprising N lenses including a plastic lens, when the total focal length of the lens system is f, the ith lens is determined as Li, the focal length of the lens Li at a standard temperature t is $f_i$, the height of incidence on the lens Li of a paraxial ray incident from the object side at a height f is hi, the refractive index of the lens Li at the temperature t is $n_i(t)$, and the thermal dispersion number $\omega_i$ of the material forming the lens Li is defined as $$\omega_i = \frac{n_i(t) - 1}{n_i(t_1) - n_i(t_2)}$$

$$\therefore t_1 < t < t_2 \text{ and}$$

$$\left| \sum_{i=1}^{N} \frac{h_i^2}{f_i \omega_i} \right| = 0$$

is the "condition of athermalization". This condition means that the value of the sum of the thermal aberration coefficients of the respective lenses over the entire system is zero. By this, the amount of movement of the focus by temperature with respect to the two points, i.e., temperatures $t_1$ and $t_2$, becomes zero.

Strictly, however, this is limited to a fixed focal length lens and in a zoom lens, the focus position varies greatly between the shortest focal length condition and the longest focal length condition. For example, when zooming is effected into the shortest focal length condition with the focus adjusted in the longest focal length condition, in-focus is attained at normal temperature but out-of-focus is brought about at high temperatures or at low temperatures. This drawback is a more serious drawback than in the case of a fixed focal length lens in which the distance scale goes wrong. For this reason, in the field of zoom lens system comprised of plastic lenses, zoom lenses of low magnification in which the movement of the focus is negligible are only found in optical systems for projection as described in U.S. Pat. Nos. 3,972,592 and 3,920,315, and the technique of correcting the focus position fluctuation resulting from any temperature change, namely, the so-called athermalization technique, remains unexplored in this field.

SUMMARY OF THE INVENTION

It is an object of the present invention to provide a zoom lens system using chiefly so-called plastic lenses made of organic glass and having the advantages peculiar to plastic lenses and which maintains practically sufficiently corrected condition of chromatic aberration and yet in which the focus position does not fluctuate in the entire magnification change range by zooming, even when there is a great temperature change.

The athermalized zoom lens according to the present invention has a plurality of lens groups including movable lens groups capable of changing their relative position for zooming, and at least one of the plurality of lens groups has at least one lens formed of inorganic glass and most of the lenses are formed of organic glass, i.e. plastics. This inorganic glass lens is such that when an organic glass lens is substituted for it, the substituting organic glass lens creates, by zooming, an amount of focus movement corresponding to the focus variation created in the entire system by zooming between predetermined temperatures.

To effect the correction of the focus position fluctuation resulting from the temperature during magnification change, namely, the athermalization, in a zoom lens system, it is ideal from the abberration theory that the focusing group, the variator group and the compensator group are uniquely athermalized, but if the athermalization is effected by using plastic materials of high thermal dispersion and low thermal dispersion for concave and convex cemented lenses, respectively, achromatization cannot be accomplished. Conversely, if preference is given to achromatization, athermalization cannot be accomplished. There is no solution which satisfies achromatization and athermalization at the same time in one group.

Therefore, the present invention first combines the amounts of focus position variation by temperature which may be called the thermal aberrations of the respective lens groups of the magnification changing system, thereby achieving the athermalization over the entire magnification change range of the entire magnification changing system. That is, in the zoom lens system according to the present invention, one or a few lens elements forming at least one of the lens groups constituting the magnification changing system are formed of inorganic glass. Where the one or more lenses are made of organic glass, such lenses are selected that the fluctuation condition of the thermal aberration created in said one or more lenses by zooming is more approximate to the fluctuation condition of the thermal aberration created in the entire system by zooming in a case where all lenses are formed of organic glass.

More particularly described, in the magnification changing system of a zoom lens in which all lens elements are made of organic glass, when k lens elements forming the magnification changing system are regarded as thin lenses and if it is assumed that the height of a paraxial ray passing through each lens in the shortest focal length condition of the entire system is $h_i^W$, that the height of a paraxial ray passing through each lens in the longest focal length condition of the entire system is $h_i^T$, that the focal length of each lens is $f_i$, that the thermal dispersion of the organic glass forming each lens is $\omega_i$ and that the subscript i represents the value of the ith lens element from the object side, then the amount of variation $\Delta V_S$ in the thermal aberration coefficient of the entire magnification changing system by zooming is expressed as $$\Delta V_S = \sum_{i=1}^{k} \left( \frac{h_i^{T2}}{f_i \omega_i} - \frac{h_i^{W2}}{f_i \omega_i} \right) \tag{1}$$

and this value corresponds to the amount of focus fluctuation by the entire magnification changing system. The amount of variation $\Delta V_x$ in thermal aberration coefficient created in the xth organic glass lens element itself by zooming is expressed as $$\Delta V_x = \frac{h_x^{T2}}{f_x \omega_x} - \frac{h_x^{W2}}{f_x \omega_x} \tag{2}$$

and this value corresponds to the amount of focus fluctuation created in the xth lens element. Accordingly, by substituting inorganic glass for the xth organic glass lens element which satisfies $$\Delta V_S \approx \Delta V_x \tag{3}$$

the athermalization in the magnification changing system is substantially achieved over the entire magnification change range by zooming.

That is, the above formula (3) means that the amount of fluctuation $\Delta V_x$ of the thermal aberration of the xth organic glass lens element is substantially equal to the amount of fluctuation $\Delta V_S$ of the thermal aberration of the magnification changing system, and this is substantially equivalent to the fact that the amount of aberration fluctuation of the entire magnification changing system is created in the xth organic glass lens. Accordingly, by this xth organic glass lens being replaced by inorganic glass in which creation of thermal aberration is negligible, the thermal aberration fluctuation in the magnification changing system by zooming can be corrected.

Also, better correction can be accomplished by substituting inorganic glass for the yth organic glass lens element in addition to the xth organic glass lens element. In this case, like equation (2), the amount of variation $\Delta V_y$ in thermal aberration coefficient created in the yth organic glass lens element by zooming is expressed as $$\Delta V_y = \frac{h_y^{T2}}{f_y \omega_y} - \frac{h_y^{W2}}{f_y \omega_y} \tag{4}$$

and the xth and yth organic glass lens elements may be chosen so that $\Delta V_S \approx \Delta V_x + \Delta V_y$. If more lens elements are formed of inorganic glass, better correction will be possible, but in that case, the effect of using plastic (organic glass) lenses is reduced and therefore, the number of inorganic glass lenses in the magnification changing system should desirably be limited to three or so. In brief, a lens element or a combination of two or three lens elements corresponding to the amount of fluctuation of the entire magnification changing system is selected and these are formed of inorganic glass.

On the basis of the fundamental concept of the present invention as described above, the aberration correction and the chromatic aberration correction with respect to a standard light ray have been effected for various zoom lens systems, whereafter correction of the thermal aberration fluctuation by zooming has been studied. As a result, it has been found that, generally, the fluctuation of general thermal aberration by zooming of a magnification changing system in which all lens elements are formed of organic glass is small in the shortest focal length condition and great in the longest focal length condition and that the value $\Delta V_S$ of the amount of variation in equation (1) is positive. As regards the amount of variation $\Delta V_x$ in equation (2) for each organic glass lens element, it is positive in case of a positive lens element and negative in case of a negative lens element. Accordingly, in the zoom lens system according to the present invention, it is necessary to substitute inorganic glass for at least one positive organic glass lens element in the magnification changing system.

The invention will become more fully apparent from the following detailed description thereof taken in conjunction with the accompanying drawings.

BRIEF DESCRIPTION OF THE DRAWINGS

FIG. 1 shows the lens construction according to a first embodiment of the present invention.

FIGS. 2A-2C show the light ray aberrations in the first embodiment, FIG. 2A showing the shortest focal length condition, FIG. 2B showing the intermediate focal length condition, and FIG. 2C showing the longest focal length condition, Sph representing spherical aberration, Ast representing astigmatism, and Dis representing distortion.

FIG. 22 shows the thermal aberration coefficient characteristic curve of each lens in the fifth embodiment.

FIGS. 26A-26C show the light ray aberrations in the sixth embodiment.

FIGS. 27A-27C show the aberrations in the sixth embodiment in which thermal aberration has been corrected.

FIGS. 31A-31C show the light ray aberrations in the seventh embodiment.

FIGS. 32A-32C show the thermal aberrations in the seventh embodiment.

DESCRIPTION OF THE PREFERRED EMBODIMENTS

Figure 3:
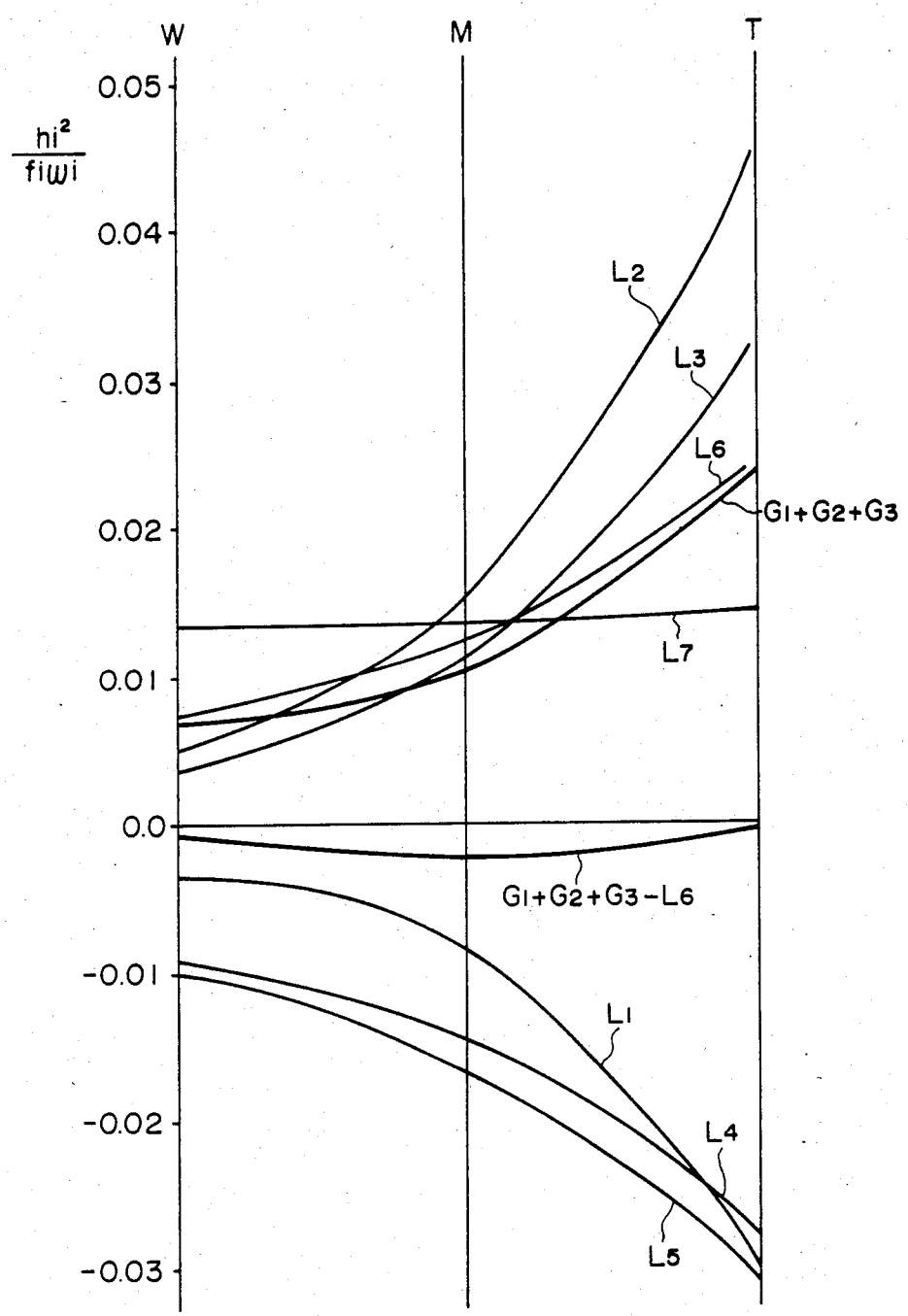
FIG. 3 shows the variation characteristic of the thermal aberration coefficient by zooming in the first embodiment, the vertical axis representing the thermal aberration coefficient and the horizontal axis representing the total focal length of the entire system.

The invention will hereinafter be described with respect to some embodiments thereof. A first embodiment of the present invention, as shown in FIG. 1, is a zoom lens system of zoom ratio 3 and F-number 3 having, in succession from the object side, a positive first group $G_1$ as a focusing group, a negative second group $G_2$ as a variator, a positive third group $G_3$ as a compensator, and a positive fourth group $G_4$ as a master lens. The first, second and third groups together constitute a magnification changing system, and the fourth group constitutes a master system. The first group $G_1$ comprises a negative lens $L_1$ formed of polystyrene (PS), a positive lens $L_2$ formed of acryl (PMMA) and cemented to the negative lens $L_1$, and a positive lens $L_3$ formed of acryl, the second group $G_2$ comprises a negative lens $L_4$ formed of acryl, a negative lens $L_5$ formed of acryl, and a positive lens $L_6$ formed of inorganic glass, and the third group $G_3$ comprises a positive lens $L_7$ formed of acryl. The fourth group $G_4$ as a master system comprises a positive lens $L_8$ formed of inorganic glass, a negative lens $L_9$ formed of polystyrene, and two positive lenses $L_{10}$ and $L_{11}$ formed of acryl. Designated by P is a prism having a half-transmitting surface for separating the light beam into a finder system, not shown, and it is not indispensable.

The numerical data of the first embodiment will be shown in Table 1 below. In Table 1, r represents the radius of curvature of each lens surface, d represents the center of thickness and spacing of each lens, n and $\nu$ represent the refractive index and the Abbe number, respectively, of each lens for the d-line ($\lambda=587.6$ nm), and the subscript numbers represent the order from the object side. $f_W$, $f_M$ and $f_T$ represent the shortest focal length, the intermediate focal length and the longest focal length, respectively, of the entire system, and $B_f$ represents the back focal length. The thermal dispersion number $\omega_i$ of each lens element is also shown in Table 1. This thermal dispersion number $\omega_i$ is a value calculated at standard temperature $T=20°$ C., low temperature $T_1=-10°$ C. and high temperature $T_2=50°$ C. (This also holds true of the following embodiments).

TABLE 1

(First Embodiment)
Focal length f = 15~45, Zoom ratio 3, F-number 1.8 Image height y = 5.5

| Radius of curvature | | Center thickness and air space | | Refractive index | | Abbe number | | Thermal dispersion number $\omega_i$ | | |
|---|---|---|---|---|---|---|---|---|---|---|
| $r_1$ | 143.352 | $d_1$ | 1.0 | $n_1$ | 1.5914 | $\nu_1$ | 31.0 | $\omega_1$ | 77.3 | $L_1$ ⎫ |
| $r_2$ | 29.984 | $d_2$ | 11.0 | $n_2$ | 1.4911 | $\nu_2$ | 56.6 | $\omega_2$ | 69.1 | $L_2$ ⎬ $G_1$ |
| $r_3$ | −102.250 | $d_3$ | 0.1 | | | | | | | |
| $r_4$ | 30.133 | $d_4$ | 6.0 | $n_3$ | 1.4911 | $\nu_3$ | 56.6 | $\omega_3$ | 69.1 | $L_3$ ⎭ |
| $r_5$ | 220.269 | $d_5$ | variable | | | | | | | |
| $r_6$ | 474.308 | $d_6$ | 1.0 | $n_4$ | 1.4911 | $\nu_4$ | 56.6 | $\omega_4$ | 69.1 | $L_4$ ⎫ |
| $r_7$ | 13.889 | $d_7$ | 4.0 | | | | | | | |
| $r_8$ | −28.403 | $d_8$ | 1.0 | $n_5$ | 1.4911 | $\nu_5$ | 56.6 | $\omega_5$ | 69.1 | $L_5$ ⎬ $G_2$ |
| $r_9$ | 12.398 | $d_9$ | 0.5 | | | | | | | |
| $r_{10}$ | 13.414 | $d_{10}$ | 3.0 | $n_6$ | 1.7552 | $\nu_6$ | 27.6 | $\omega_6$ | 0.0 | $L_6$ ⎭ |
| $r_{11}$ | 28.697 | $d_{11}$ | variable | | | | | | | |
| $r_{12}$ | 75.831 | $d_{12}$ | 2.2 | $n_7$ | 1.4911 | $\nu_7$ | 56.6 | $\omega_7$ | 69.1 | $L_7$-$G_3$ |
| $r_{13}$ | −35.035 | $d_{13}$ | variable | | | | | | | |
| $r_{14}$ | ∞ | $d_{14}$ | 7.5 | $n_8$ | 1.5750 | $\nu_8$ | 41.5 | $\omega_8$ | 0.0 | Prism P |

TABLE 1-continued (First Embodiment)
Focal length f = 15~45, Zoom ratio 3, F-number 1.8 Image height y = 5.5

| | | | | | | | | | |
|---|---|---|---|---|---|---|---|---|---|
| $r_{15}$ | ∞ | $d_{15}$ | 5.9 | | | | | | |
| $r_{16}$ | 11.209 | $d_{16}$ | 5.2 | $n_9$ 1.5186 | $\nu_9$ 70.1 | $\omega_9$ | 0.0 | $L_8$ | |
| $r_{17}$ | −55.549 | $d_{17}$ | 2.13 | | | | | | |
| $r_{18}$ | −19.228 | $d_{18}$ | 4.8 | $n_{10}$ 1.5914 | $\nu_{10}$ 31.0 | $\omega_{10}$ | 77.3 | $L_9$ | |
| $r_{19}$ | 9.657 | $d_{19}$ | 2.45 | | | | | | $G_4$ |
| $r_{20}$ | 36.745 | $d_{20}$ | 4.3 | $n_{11}$ 1.4911 | $\nu_{11}$ 56.6 | $\omega_{11}$ | 69.1 | $L_{10}$ | |
| $r_{21}$ | −29.730 | $d_{21}$ | 0.2 | | | | | | |
| $r_{22}$ | 14.651 | $d_{22}$ | 6.0 | $n_{12}$ 1.4911 | $\nu_{12}$ 56.6 | $\omega_{12}$ | 69.1 | $L_{11}$ | |
| $r_{23}$ | −34.011 | $B_f$ | 12.235 | | | | | | |

| | $f_W = 15$ | $f_M = 26$ | $f_T = 45$ |
|---|---|---|---|
| $d_5$ | 2.121 | 12.687 | 18.896 |
| $d_{11}$ | 19.309 | 12.856 | 1.874 |
| $d_{13}$ | 5.094 | 0.981 | 5.754 |

The lens construction of the first embodiment is shown in FIG. 1, and the light ray aberrations therein are shown in FIG. 2. FIG. 2A show the shortest focal length condition, FIG. 2B shows the intermediate focal length condition, FIG. 2C shows the longest focal length condition, Sph indicates spherical aberration, Ast indicates astigmatism, and Dis indicates distortion. The showing is made with the d-line (λ=587.6 nm) used as the standard wavelength nd with the g-line (λ=435.8 nm) used as the standard of correction of chromatic aberration. (This also holds true of the following embodiments.)

In this first embodiment, even if all the lens elements are formed of organic glass, the aberrations and chromatic aberration of standard ray can be practically sufficiently corrected, but for the correction of thermal aberration, the positive meniscus lens $L_6$ in the second group $G_2$ which is the sixth lens element and the positive lens $L_8$ in the master system $G_4$ which is the eighth lens element are formed of inorganic glass. To explain the correction of the fluctuation of the thermal aberration in the present embodiment, the value of the thermal aberration coefficient of each lens element of the magnification changing system, i.e., the first $G_1$, the second $G_2$ and the third group $G_3$, in a case where the sixth lens element $L_6$ is formed of polystyrene (PS) is shown in Table 2. In Table 2, W represents the thermal aberration coefficient $h_i^{W2}/f_i\omega_i$ in the shortest focal length condition, T represents the thermal aberration coefficient $h_i^{T2}/f_i\omega_i$ in the longest focal length condition, and ΔV represents the difference between the two as shown by the aforementioned equation (2). Each value is based on the thermal dispersion number $\omega_i$ in a case where the standard temperature T=20° C., the low temperature $T_1 = -10°$ C. and the high temperature $T_2 = 50°$ C. (This also holds true of the following embodiments.)

TABLE 2

| | | W | T | ΔV | |
|---|---|---|---|---|---|
| $G_1$ | $L_1$ | −0.00367 | −0.03134 | −0.02767 | PS |
| | $L_2$ | 0.00527 | 0.04499 | 0.03972 | PMMA |
| | $L_3$ | 0.00379 | 0.03238 | 0.02859 | PMMA |
| $G_2$ | $L_4$ | −0.00901 | −0.02796 | −0.01895 | PMMA |
| | $L_5$ | −0.0102 | −0.03169 | −0.02149 | PMMA |
| | $L_6$ | 0.00763 | 0.0237 | 0.01607 = $\Delta V_x$ | PS |
| $G_3$ | $L_7$ | 0.01378 | 0.01405 | 0.00027 | PMMA |
| Total ($G_1 + G_2 + G_3$) | | 0.00759 | 0.02413 | 0.01654 = $\Delta V_S$ | |
| After correction $G_1 + G_2 + G_3 - L_6$ | | −0.00004 | 0.00043 | 0.00047 | |

TABLE 2-continued

| W | T | ΔV |
|---|---|---|

(1st Embodiment)

It can be seen from Table 2 that where all the lens elements are formed of organic glass, the lens element having an amount of variation substantially equal to the amount of variation ΔV of the thermal aberration coefficient in the entire magnification changing system is the sixth lens $L_6$. Accordingly, after the correction in which the sixth lens $L_6$ has been formed of inorganic glass instead of organic glass, the amount of variation is as small as ΔV=0.00047 and the fluctuation of thermal aberration is corrected well.

FIG. 3 shows the variation charcteristics of the thermal aberration coefficient by zooming obtained by attention to the value of the thermal aberration coefficient in the intermediate focal length condition in addition to the values shown in Table 2 and plotting these. From this characteristic curve, the correction of the thermal aberration is apparent. In FIG. 3, the vertical axis represent the thermal aberration coefficient $h_i^2/f_i\omega_i$, the horizontal axis represents the total focal length of the entire system, W represents the shortest focal length, M represents the intermediate focal length, and T represents the longest focal length. It can be seen from the thermal aberration characteristic of FIG. 3 that the sixth lens $L_6$ exhibits a variation most approximate to the characteristic of the composite thermal aberration coefficient $(G_1+G_2+G_3)$ of the magnification changing system in a case where all the lens elements are formed of plastics (organic glass). So, if the sixth lens $L_6$ is formed of inorganic glass, the thermal aberration of inorganic glass is negligible as compared with organic glass and therefore is substantially zero and the characteristic after correction is such as indicated by a thich curve $(G_1+G_2+G_3-L_6)$ in the figure. In this condition, the fluctuation of the thermal aberration coefficient is small over the entire magnification change range of zooming and the absolute amount of the aberration coefficient is also small. Accordingly, the fluctuation of the thermal aberration is sufficiently corrected by forming only the sixth lens $L_6$ of inorganic glass.

The correction of the thermal aberration fluctuation resulting from zooming in the first embodiment is accomplished in the above-described manner, but if all of the fourth group $G_4$ which is the master lens system is formed of plastics, the thermal aberration will be substantial in the positive sense in this group and therefore, the foremost positive lens $L_8$ in the fourth group $G_4$ is also formed of inorganic glass. Since the master lens system has a constant focal length, the thermal aberration here is not varied with zooming, but in the characteristic graph of FIG. 3, it is indicated by a straight line and becomes a direct current component. Correction of the direct current component can be accomplished by a combination of a positive lens and a negative lens as is the conventional thermal aberration correction in a fixed focus lens. However, in the master lens system of the present embodiment, although the negative thermal aberration created in the negative lens $L_9$ is substantially offset by the positive thermal aberration created in the two positive lens $L_{10}$ and $L_{11}$ rearward of the negative lens $L_9$, the positive thermal aberration in the foremost positive lens $L_8$ in the master lens system remains and therefore, this positive lens $L_8$ is also formed of inorganic glass and the direct current component of the thermal aberration in the master lens system has been corrected well.

Figure 4A:
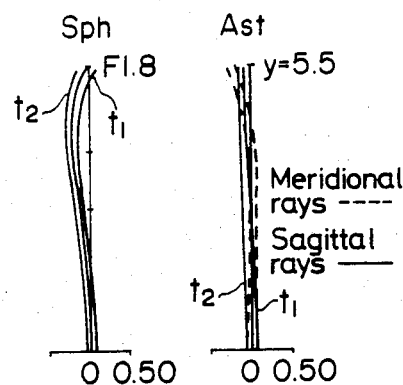
FIGS. 4A-4C show the aberrations in the first embodiment in which the thermal aberration has been corrected, FIG. 4A showing the shortest focal length condition, FIG. 4B showing the intermediate focal length condition, and FIG. 4C showing the longest focal length condition.
Figure 4B:
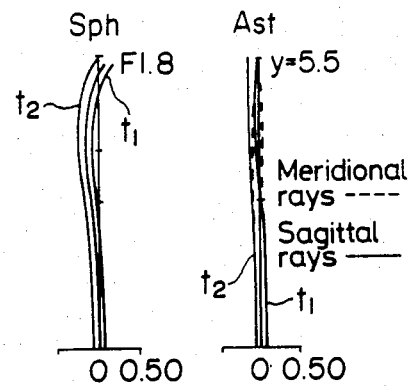
Figure 4C:
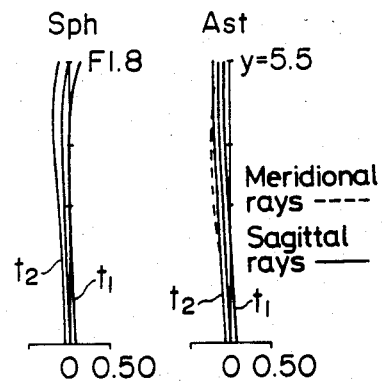
Figure 5A:
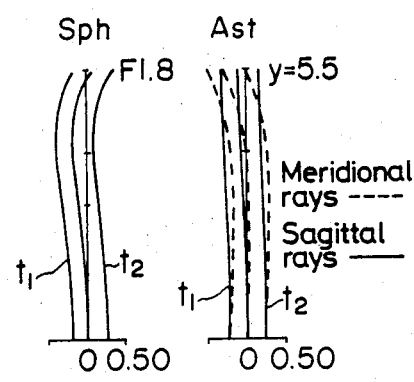
FIGS. 5A-5C show the aberrations before correction of thermal aberration, FIG. 5A showing the shortest focal length condition, FIG. 5B showing the intermediate focal length condition, and FIG. 5C showing the longest focal length condition.
Figure 5B:
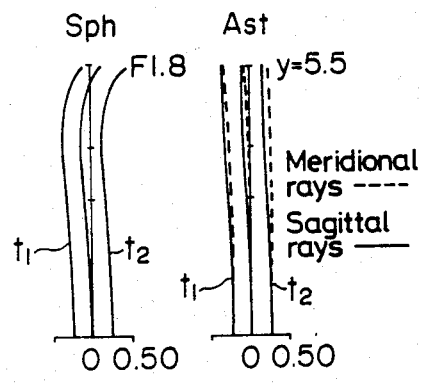
Figure 5C:
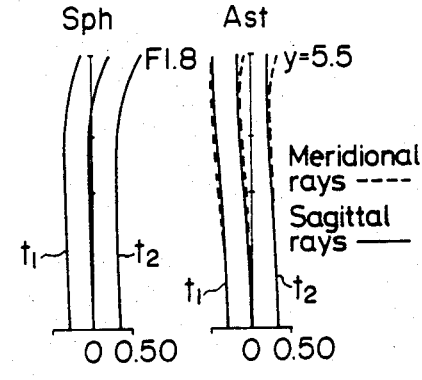

FIGS. 4 and 5 show what imaging performance the first embodiment has for temperature change by such correction of the thermal aberration. FIG. 4 illustrates the aberrations in the first embodiment wherein the thermal aberration has been corrected, and FIG. 5 illustrates the aberrations before the thermal aberration is corrected. In each of these figures, A shows the shortest focal length condition, B shows the intermediate focal length condition, C shows the longest focal length condition, Sph indicates spherical aberration, and Ast indicates astigmatism. Also, the standard temperature is 20° C., the low temperature condition of −10° C. is indicated by $T_1$, and the high temperature condition of 50° C. is indicated by $T_2$. It is apparent from these thermal aberration graphs that in the zoom lnes of the present embodiment, the fluctuation of the focus position is small in the entire magnification change range of zooming for a great temperature change from −10° C. to 50° C. and moreover, a practically sufficient imaging performance is always maintained.

A second embodiment of the present invention is a zoom lens system similar to the first embodiment. However, in the second embodiment, most of the lens elements which have been formed of acryl in the first embodiment are formed of diethylene glicol bisallylcarbonate polymer known as CR-39 (registered trademark). The numerical data of the second embodiment will be shown in Table 3 below.

TABLE 3

(Second Embodiment)
Focal length f = 15~45, Zoom ratio 3, F-number 1.8 Image height y = 5.5

| Radius of curvature | | Center thickness and air space | | Refractive index | | Abbe number | | Thermal dispersion number$\omega_l$ | | | |
|---|---|---|---|---|---|---|---|---|---|---|---|
| $r_1$ | 154.994 | $d_1$ | 1.0 | $n_1$ | 1.5914 | $v_1$ | 31.0 | $\omega_1$ | 77.3 | $L_1$ | ⎫ |
| $r_2$ | 30.139 | $d_2$ | 11.0 | $n_2$ | 1.4988 | $v_2$ | 61.5 | $\omega_2$ | 48.4 | $L_2$ | ⎬ $G_1$ |
| $r_3$ | −102.250 | $d_3$ | 0.1 | | | | | | | | |
| $r_4$ | 29.529 | $d_4$ | 6.0 | $n_3$ | 1.4911 | $v_3$ | 56.6 | $\omega_3$ | 69.1 | $L_3$ | ⎭ |
| $r_5$ | 185.427 | $d_5$ | variable | | | | | | | | |
| $r_6$ | 107.699 | $d_6$ | 1.0 | $n_4$ | 1.4988 | $v_4$ | 61.5 | $\omega_4$ | 48.4 | $L_4$ | ⎫ |
| $r_7$ | 13.985 | $d_7$ | 4.0 | | | | | | | | |
| $r_8$ | −25.888 | $d_8$ | 1.0 | $n_5$ | 1.4988 | $v_5$ | 61.5 | $\omega_5$ | 48.4 | $L_5$ | ⎬ $G_2$ |
| $r_9$ | 12.398 | $d_9$ | 0.5 | | | | | | | | |
| $r_{10}$ | 13.384 | $d_{10}$ | 3.0 | $n_6$ | 1.7552 | $v_6$ | 27.6 | $\omega_6$ | 0.0 | $L_6$ | ⎭ |
| $r_{11}$ | 27.822 | $d_{11}$ | variable | | | | | | | | |
| $r_{12}$ | 75.831 | $d_{12}$ | 2.2 | $n_7$ | 1.4911 | $v_7$ | 56.6 | $\omega_7$ | 69.1 | $L_7$-$G_3$ | |
| $r_{13}$ | −35.034 | $d_{13}$ | variable | | | | | | | | |
| $r_{14}$ | ∞ | $d_{14}$ | 7.5 | $n_8$ | 1.5750 | $v_8$ | 41.5 | $\omega_8$ | 0.0 | Prism P | |
| $r_{15}$ | ∞ | $d_{15}$ | 5.9 | | | | | | | | |
| $r_{16}$ | 10.882 | $d_{16}$ | 5.2 | $n_9$ | 1.5186 | $v_9$ | 70.1 | $\omega_9$ | 0.0 | $L_8$ | ⎫ |
| $r_{17}$ | −66.021 | $d_{17}$ | 2.13 | | | | | | | | |
| $r_{18}$ | −19.171 | $d_{18}$ | 4.8 | $n_{10}$ | 1.5914 | $v_{10}$ | 31.0 | $\omega_{10}$ | 77.3 | $L_9$ | ⎬ $G_4$ |
| $r_{19}$ | 9.355 | $d_{19}$ | 2.45 | | | | | | | | |
| $r_{20}$ | 38.769 | $d_{20}$ | 4.3 | $n_{11}$ | 1.4988 | $v_{11}$ | 61.5 | $\omega_{11}$ | 48.4 | $L_{10}$ | |
| $r_{21}$ | −29.730 | $d_{21}$ | 0.2 | | | | | | | | |
| $r_{22}$ | 14.651 | $d_{22}$ | 6.0 | $n_{12}$ | 1.4988 | $v_{12}$ | 61.5 | $\omega_{12}$ | 48.4 | $L_{11}$ | ⎭ |
| $r_{23}$ | −32.052 | $B_f$ | 12.29 | | | | | | | | |
| | | $f_W = 15$ | | | $f_M = 26$ | | | $f_T = 45$ | | | |
| | $d_5$ | 1.780 | | | 12.346 | | | 18.555 | | | |
| | $d_{11}$ | 19.596 | | | 13.143 | | | 2.161 | | | |
| | $d_{13}$ | 4.690 | | | 0.577 | | | 5.350 | | | |

Figure 6A:
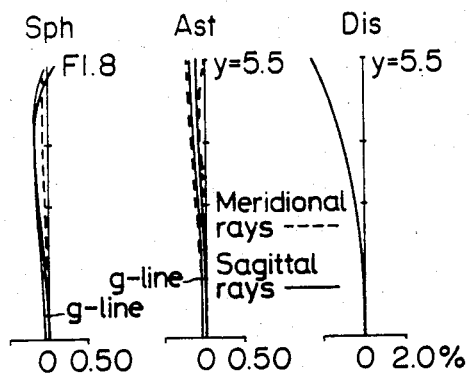
FIGS. 6A-6C show the light ray aberrations in a second embodiment, FIGS. 6A, 6B and 6C showing the conditions similar to those of FIG. 2.
Figure 6B:
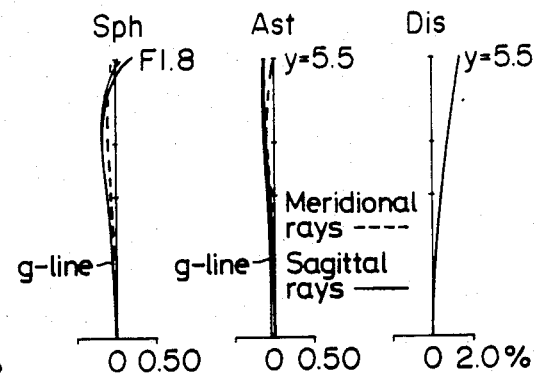
Figure 6C:
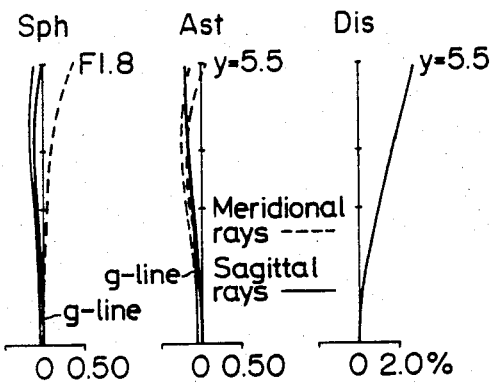

The light ray aberrations in the second embodiment are shown in FIG. 6. The value of the thermal aberration coefficient of each lens element of the first group $G_1$, the second group $G_2$ and the third group $G_3$ of the magnification changing system will be shown in Table 4 below. In the second embodiment, as shown in Table 4, where the lens elements are formed of only polystyrene PS and CR-39, a lens element having an amount of variation of the same degree as the amount of variation $\Delta V_S$ of the thermal aberration coefficient of the entire magnification changing system does not exist and the fluctuation of the thermal aberration coefficient is not sufficiently corrected by substituting inorganic glass for only one lens element in the magnification changing system. Therefore, if the third lens $L_3$ formed of CR-39 is formed of acryl PM, the amount of variation in the entire magnification changing system becomes $\Delta V_S' = 0.01595$ and it will be seen that this value is of the same degree as the amount of variation of the sixth lens $L_6$. Accordingly, the variation in thermal aberration coefficient can be minimized by forming the sixth lens $L_6$ of inorganic glass.

TABLE 4

| | | W | T | ΔV | |
|---|---|---|---|---|---|
| $G_1$ | $L_1$ | −0.00367 | −0.03134 | −0.02767 | PS |
| | $L_2$ | 0.00751 | 0.06419 | 0.05668 | CR39 |
| | $L_3$ | 0.00541 | 0.04619 | 0.04078 | CR39 |

TABLE 4-continued

|  |  | W | T | ΔV |  |
|---|---|---|---|---|---|
| $G_2$ | $L_4$ | −0.01285 | −0.03988 | −0.02703 | CR39 |
|  | $L_5$ | −0.01458 | −0.04522 | −0.03064 | CR39 |
|  | $L_6$ | 0.00763 | 0.02367 | 0.01604 = $\Delta V_x$ | PS |
| $G_3$ | $L_7$ | 0.01966 | 0.02003 | 0.00037 | CR39 |
| Total ($G_1 + G_2 + G_3$) |  | 0.00911 | 0.03764 | 0.02853 = $\Delta V_s$ |  |
| $L_3'$ |  | 0.0039 | 0.0321 | 0.0282 | Substitute PMMA for CR-39 |
| Total ($G_1 + G_2 + G_3$) |  | 0.0076 | 0.02355 | 0.01595 = $\Delta V_s'$ |  |
| After correction $G_1 + G_2 + G_3 − L_6$ (2nd Embodiment) |  | −0.00003 | −0.00012 | −0.00009 |  |

Figure 7:
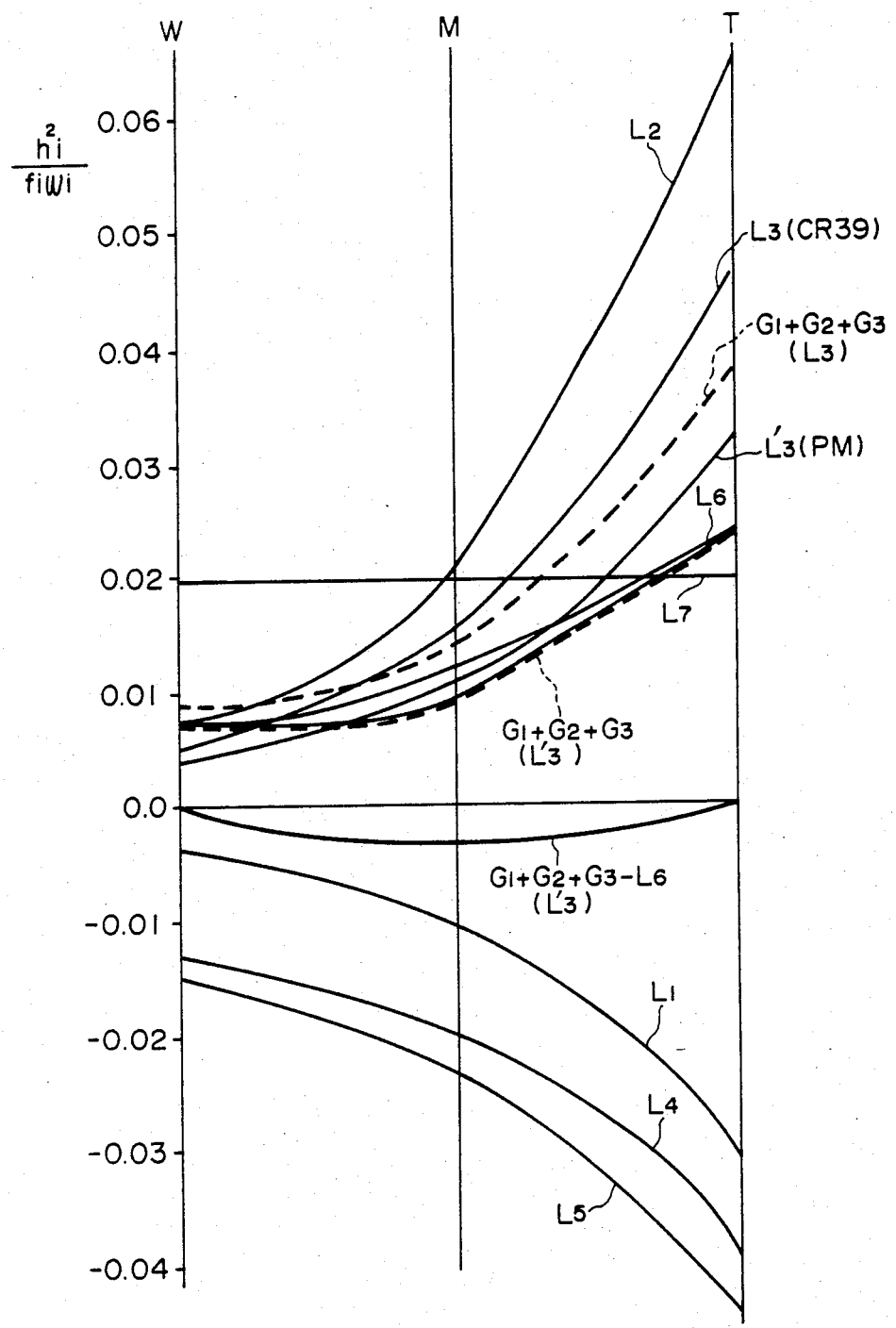
FIG. 7 shows the characteristic curve of the thermal aberration coefficient of each lens element in the magnification changing system in the second embodiment in the same manner as FIG. 3.

FIG. 7 shows the characteristic curve of the thermal aberration coefficient of each lens element in the magnification changing system in the second embodiment in the same manner as FIG. 3. In FIG. 7, two thick dotted-line curves show the composite characteristic in the magnification changing system before correction, and the upper one refers to a case where the third lens $L_3$ is formed of CR-39 and the lower one refers to a case where the third lens $L'_3$ is formed of acryl PM. It can be seen from this figure that where the third lens $L'_3$ is formed of acryl PM, the characteristic in the entire magnification changing system very well conforms to the characteristic of the sixth lens $L_6$. The characteristic curve of the entire magnification changing system after the sixth lens $L_6$ has been formed of inorganic glass is expressed as the result of subtracting the characteristic curve of the sixth lens $L_6$ from the lower dotted-line curve and is indicated by a thick solid line in the figure. Accordingly, in the second embodiment, the thermal aberration in the magnification changing system is well corrected by using three types of plastic lenses formed of polystyrene PS, CR-39 and acryl PM, respectively, and forming the sixth lens $L_6$ in the magnification changing system of inorganic glass. In the second embodiment, as in the first embodiment, the thermal aberration correction in the fourth group $G_4$ of the master lens system has been effected by forming only the foremost positive lens $L_8$ in the fourth group of inorganic glass.

Figure 8A:
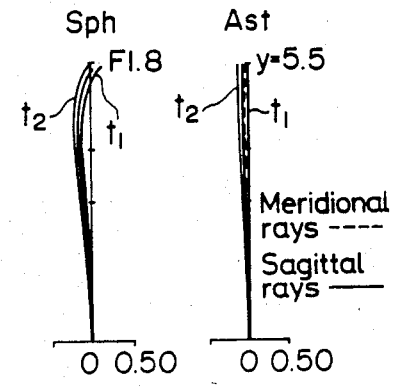
FIGS. 8A-8C show the condition after correction of thermal aberration with regard to the second embodiment in the same manner as FIG. 4.
Figure 8B:
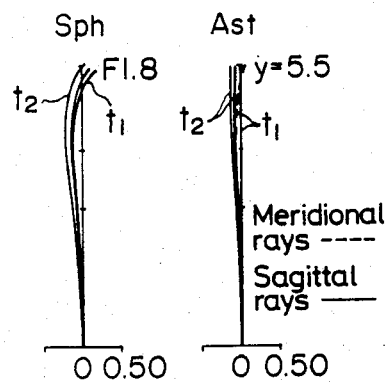
Figure 8C:
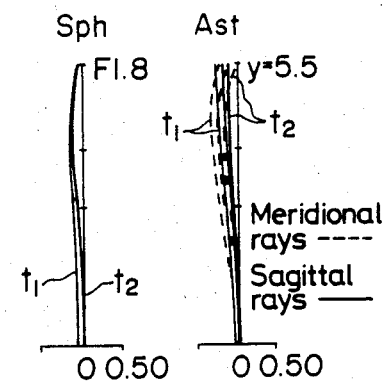
Figure 9A:
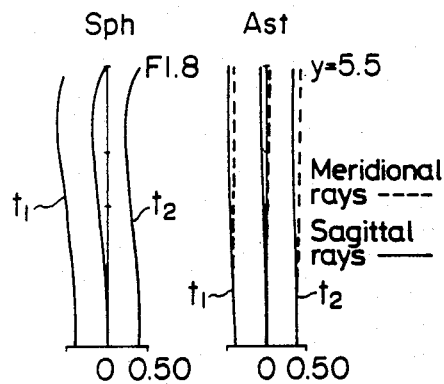
FIGS. 9A-9C show the condition before correction of thermal aberration with regard to the second embodiment in the same manner as FIG. 5.
Figure 9B:
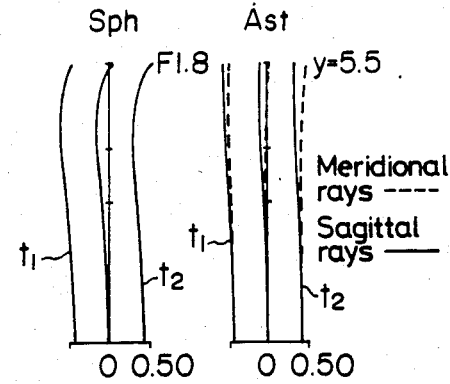
Figure 9C:
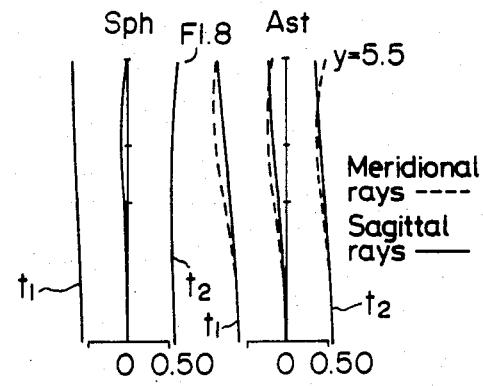

The condition of the second embodiment after correction of the thermal aberration is shown in FIG. 8, and the condition of the second embodiment before correction of the thermal aberration is shown in FIG. 9. From comparison between these two figures, it is apparent that again in this second embodiment, the fluctuation of the focus position is small even for a great temperature change from −10° C. to 50° C. over the entire range of zooming and an excellent imaging performance is maintained.

Figure 10:
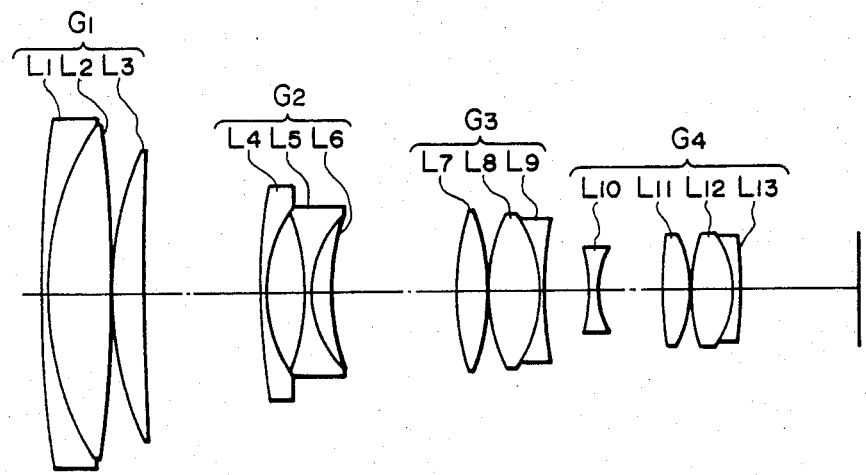
FIG. 10 shows the lens construction according to a third embodiment.

A third embodiment of the present invention will now be described. In the third embodiment, the magnification changing system comprises a positive first group $G_1$, a negative second group $G_2$ and a positive third group $G_3$, and this embodiment is basically similar to the first and second embodiments in group construction. However, in this embodiment, the zoom ratio is 6 and the F-number is 1.6 and the construction of each group differs from the first and second embodiments as shown in FIG. 10. The first group $G_1$ comprises a negative lens $L_1$ formed of polystyrene PS, a positive lens $L_2$ formed of acryl PMMA and cemented to the negative lens $L_1$, and a positive lens $L_3$ formed of acryl, the second group $G_2$ comprises a negative lens $L_4$ formed of acryl, a negative lens $L_5$ formed of acryl, and a positive lens $L_6$ of polystyrene cemented to The negative lens $L_5$, the third group $G_3$ comprises a positive lens $L_7$ of acryl, a positive lens $L_8$ formed of inorganic glass, and a negative lens $L_9$ of polystyrene cemented to the positive lens $L_8$, and the fourth group $G_4$ as the master lens system comprises a negative lens $L_{10}$ of acryl, a positive lens $L_{11}$ of acryl, a positive lens $L_{12}$ of acryl and a negative lens $L_{13}$ of polystyrene cemented to the positive lens $L_{12}$.

Figure 11A:
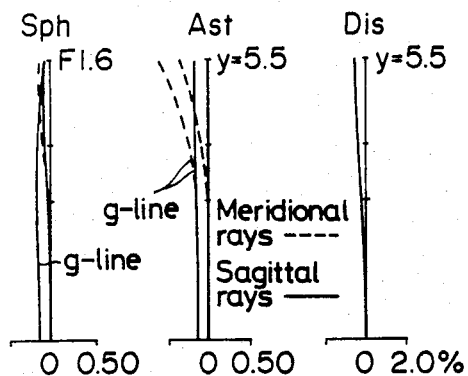
FIGS. 11A-11C show the light ray aberrations in the third embodiment in the same manner as FIG. 2.
Figure 11B:
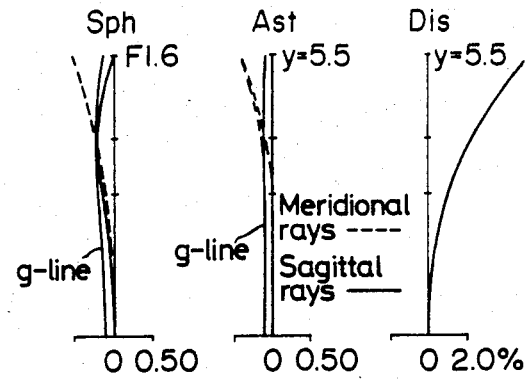
Figure 11C:
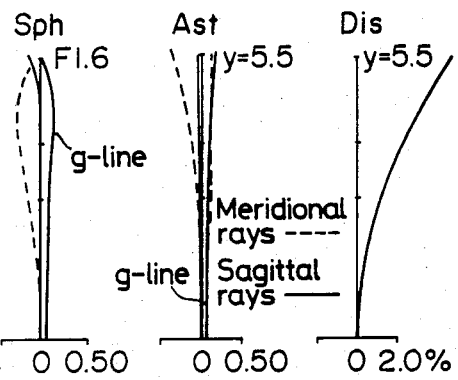

The numerical data of the third embodiment will be shown in Table 5 below, and the light ray aberrations therein are shown in FIG. 11. The values of the thermal aberration coefficients in the magnification changing system of the present embodiment are shown in Table 6 below. It can be seen from Table 6 that where all the lens elements are formed of organic glass, the lens element having substantially the same amount of variation as the amount of variation $\Delta V_S$ of the thermal aberration coefficient in the entire magnification changing system is the eight lens $L_8$. Accordingly, by forming the eighth lens $L_8$ of inorganic glass, the amount of variation of the entire magnification changing system becomes $\Delta V=0.01537$ and the variation in thermal aberration coefficient can be made small.

TABLE 5

(Third Embodiment)
Focal length f = 12.5~75, Zoom ratio 6, F-number 1.6 Image height y = 5.5

| Radius of curvature | | Center thickness and air space | | Refractive index | | Abbe number | | Thermal dispersion number$\omega_i$ | | | |
|---|---|---|---|---|---|---|---|---|---|---|---|
| $r_1$ | 171.794 | $d_1$ | 1.4 | $n_1$ | 1.5914 | $v_1$ | 31.0 | $\omega_1$ | 77.3 | $L_1$ | $G_1$ |
| $r_2$ | 44.763 | $d_2$ | 10.5 | $n_2$ | 1.4911 | $v_2$ | 56.6 | $\omega_2$ | 69.1 | $L_2$ | |
| $r_3$ | −166.580 | $d_3$ | 0.2 | | | | | | | | |
| $r_4$ | 51.712 | $d_4$ | 5.0 | $n_3$ | 1.4911 | $v_3$ | 56.6 | $\omega_3$ | 69.1 | $L_3$ | |
| $r_5$ | 524.796 | $d_5$ | variable | | | | | | | | |
| $r_6$ | 64.079 | $d_6$ | 1.0 | $n_4$ | 1.4911 | $v_4$ | 56.6 | $\omega_4$ | 69.1 | $L_4$ | $G_2$ |
| $r_7$ | 18.833 | $d_7$ | 6.8 | | | | | | | | |
| $r_8$ | −31.706 | $d_8$ | 1.0 | $n_5$ | 1.4911 | $v_5$ | 56.6 | $\omega_5$ | 69.1 | $L_5$ | |
| $r_9$ | 14.579 | $d_9$ | 3.5 | $n_6$ | 1.5914 | $v_6$ | 31.0 | $\omega_6$ | 77.3 | $L_6$ | |
| $r_{10}$ | 31.257 | $d_{10}$ | variable | | | | | | | | |
| $r_{11}$ | 34.936 | $d_{11}$ | 5.0 | $n_7$ | 1.4911 | $v_7$ | 56.6 | $\omega_7$ | 69.1 | $L_7$ | $G_3$ |
| $r_{12}$ | −35.182 | $d_{12}$ | 0.1 | | | | | | | | |
| $r_{13}$ | 19.512 | $d_{13}$ | 9.0 | $n_8$ | 1.5014 | $v_8$ | 56.6 | $\omega_8$ | 0.0 | $L_8$ | |
| $r_{14}$ | −17.161 | $d_{14}$ | 1.0 | $n_9$ | 1.5914 | $v_9$ | 31.0 | $\omega_9$ | 77.3 | $L_9$ | |
| $r_{15}$ | 57.128 | $d_{15}$ | variable | | | | | | | | |
| $r_{16}$ | −19.280 | $d_{16}$ | 1.0 | $n_{10}$ | 1.4911 | $v_{10}$ | 56.6 | $\omega_{10}$ | 69.1 | $L_{10}$ | |
| $r_{17}$ | 11.647 | $d_{17}$ | 11.6 | | | | | | | | |

TABLE 5-continued (Third Embodiment)
Focal length f = 12.5~75, Zoom ratio 6, F-number 1.6 Image height y = 5.5

| | | | | | | | | | | | |
|---|---|---|---|---|---|---|---|---|---|---|---|
| $r_{18}$ | 108.097 | $d_{18}$ | 5.0 | $n_{11}$ | 1.4911 | $\nu_{11}$ | 56.6 | $\omega_{11}$ | 69.1 | $L_{11}$ | |
| $r_{19}$ | −14.194 | $d_{19}$ | 0.1 | | | | | | | | $G_4$ |
| $r_{20}$ | 25.312 | $d_{20}$ | 7.0 | $n_{12}$ | 1.4911 | $\nu_{12}$ | 56.6 | $\omega_{12}$ | 69.1 | $L_{12}$ | |
| $r_{21}$ | −11.895 | $d_{21}$ | 1.0 | $n_{13}$ | 1.5914 | $\nu_{13}$ | 31.0 | $\omega_{13}$ | 77.3 | $L_{13}$ | |
| $r_{22}$ | −88.022 | $B_f$ | 20.22 | | | | | | | | |

| | $f_W = 12.5$ | $f_M = 30.6$ | $f_T = 75$ |
|---|---|---|---|
| $d_5$ | 1.765 | 19.495 | 30.648 |
| $d_{10}$ | 44.910 | 21.485 | 1.625 |
| $d_{15}$ | 2.136 | 7.831 | 16.538 |

TABLE 6

| | | W | T | ΔV | |
|---|---|---|---|---|---|
| $G_1$ | $L_1$ | −0.001642 | −0.05976 | −0.05812 | PS |
| | $L_2$ | 0.002472 | 0.08998 | 0.08751 | PMMA |
| | $L_3$ | 0.001609 | 0.05855 | 0.05694 | PMMA |
| $G_2$ | $L_4$ | −0.002962 | −0.03554 | −0.03258 | PMMA |
| | $L_5$ | −0.006618 | −0.07941 | −0.07279 | PMMA |
| | $L_6$ | 0.002929 | 0.03514 | 0.03221 | PS |
| $G_3$ | $L_7$ | 0.02609 | 0.05728 | 0.03119 | PMMA |
| | $L_8$ | 0.04616 | 0.10134 | 0.05518 = $\Delta V_x$ | PMMA |
| | $L_9$ | −0.01922 | −0.04821 | −0.02899 | PS |
| Total ($G_1 + G_2 + G_3$) | | 0.048818 | 0.11937 | 0.070552 = $\Delta V_S$ | |
| $G_1 + G_2 + G_3 − L_8$ | | 0.002658 | 0.01803 | 0.01537 | |

(3rd Embodiment)

Figure 13A:
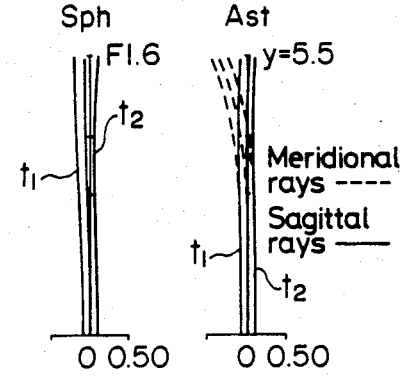
FIGS. 13A-13C show the aberrations in the third embodiment after correction of thermal aberration in the same manner as FIG. 4.
Figure 13B:
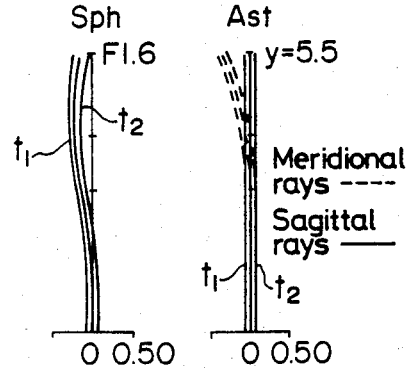
Figure 13C:
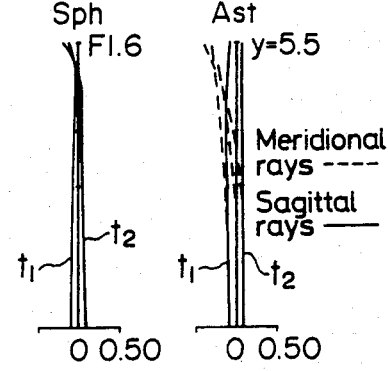
Figure 12:
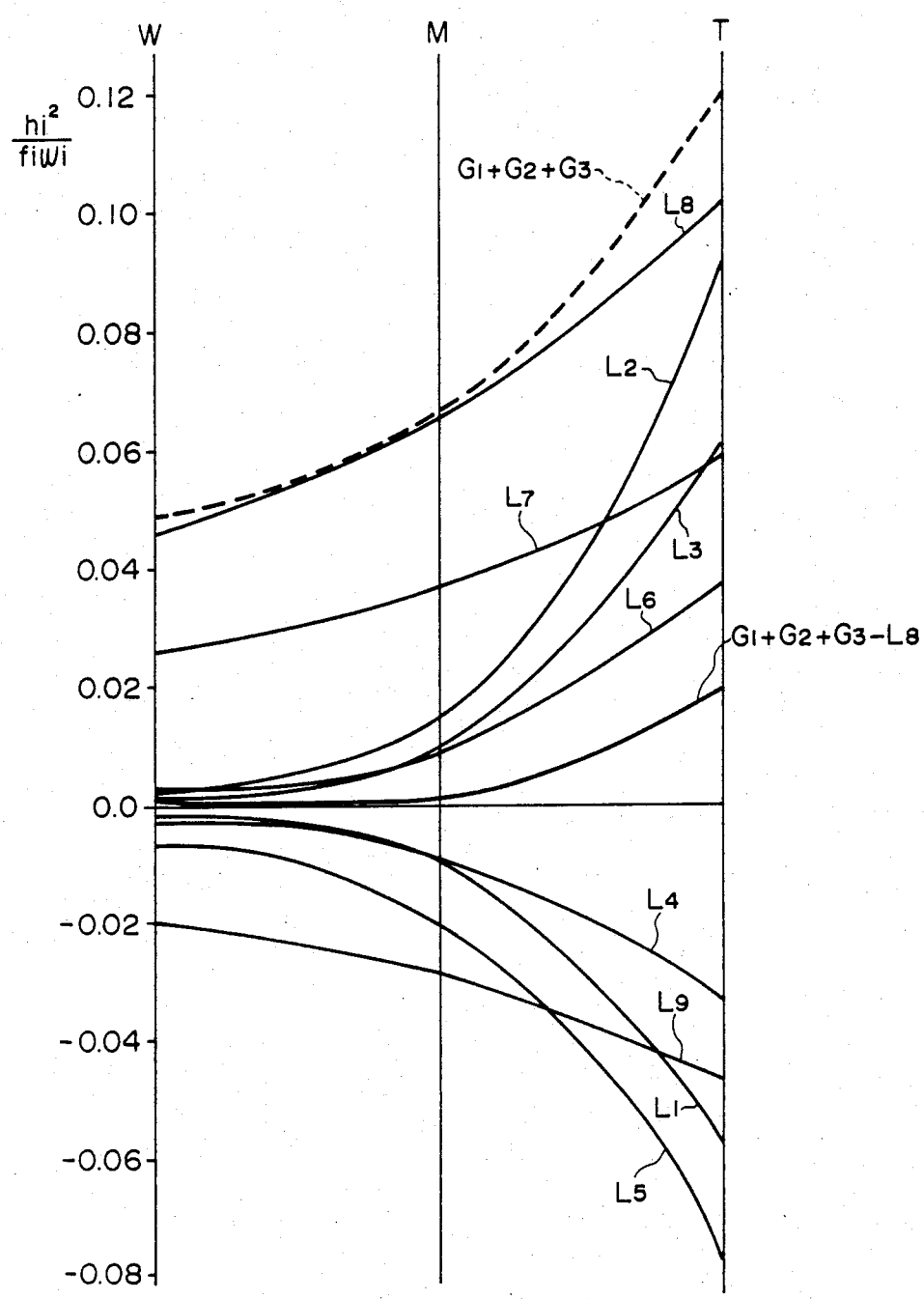
FIG. 12 shows the thermal aberration coefficient characteristic of each lens in the magnification changing system in the third embodiment in the same manner as FIG. 3.
Figure 14A:
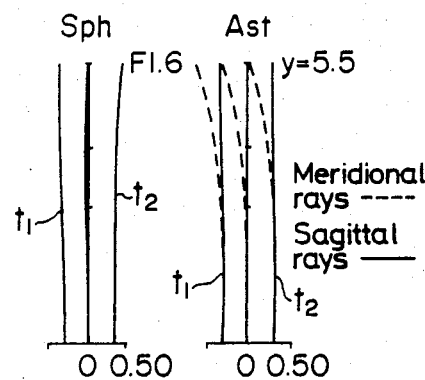
FIGS. 14A-14C show the aberrations in the third embodiment before correction of thermal aberration in the same manner as FIG. 5.
Figure 14B:
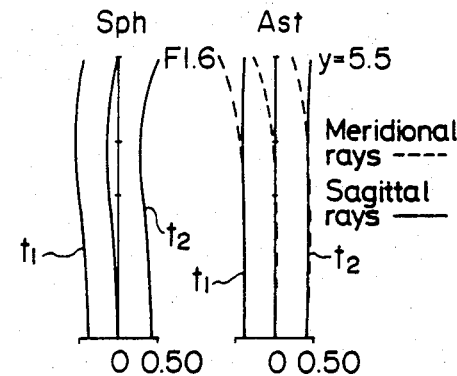
Figure 14C:
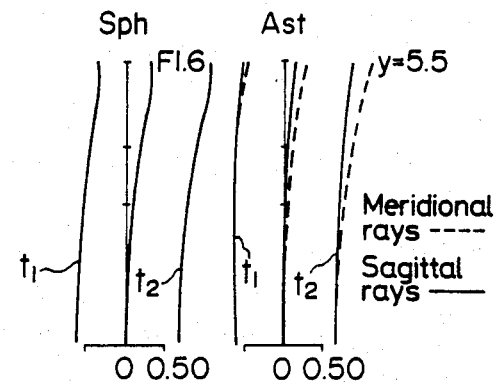

FIG. 12 shows the thermal aberration coefficient characteristic of each lens in the magnification changing system in the third embodiment. It is seen from FIG. 12 that the characteristic ($G_1+G_2+G_3$) of the entire magnification changing system is similar to the characteristic of the eighth lens $L_8$. Accordingly, the characteristic of the entire magnification changing system in a case where the eighth lens $L_8$ is formed of inorganic glass is $G_1+G_2+G_3−L_8$ and, as indicated by a thick solid line, the focus fluctuation in the shortest focal length condition slightly remains but is substantially well corrected over the entire magnification change range. In the present embodiment, the fourth group $G_4$ as the master lens system has two positive lenses and two negative lenses and therefore, the direct current component of the thermal aberration in the fourth group itself is substantially corrected by the use of organic glass alone. Therefore, in the third embodiment, if only one positive lens $L_8$ in the third group $G_3$ is replaced by inorganic glass, all the other lenses can be made of plastics (organic glass) and thus, there will be provided a zoom lens which is light in weight and easy to manufacture. FIG. 13 shows the aberrations in the present embodiment after correction of the thermal aberration, and FIG. 14 shows the aberrations in the present embodiment before correction of the thermal aberration. It is apparent from these aberration graphs that in the zoom lens of the present embodiment, the thermal aberration is well corrected in spite of the fact that the zoom lens includes only one lens of inorganic glass.

Figure 15:
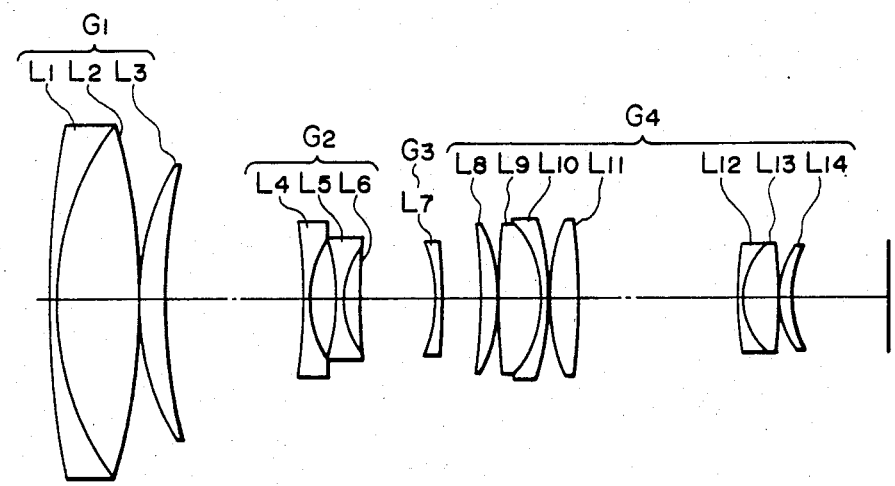
FIG. 15 shows the lens construction according to a fourth embodiment.

A fourth embodiment of the present invention is a zoom lens of zoom ratio 6 and F-number 1.6 in which the magnification changing system comprises a positive first group $G_1$, a negative second group $G_2$ as a variator, and a negative third group $G_3$ as a compensator. The specific lens construction of this embodiment is shown in FIG. 15, wherein the first group $G_1$ comprises a negative lens $L_1$ of polystyrene PS, a positive lens $L_2$ of acryl PMMA cemented to the negative lens $L_1$, and a positive lens $L_3$ of inorganic glass, the second group $G_2$ comprises a negative lens $L_4$ of acryl, a negative lens $L_5$ of acryl and a positive lens $L_6$ of polystyrene cemented to the negative lens $L_5$, and the third group $G_3$ comprises a negative lens $L_7$ of acryl. The fourth group $G_4$ as a master lens comprises a positive lens $L_8$ of acryl, a positive lens $L_9$ of inorganic glass, a negative lens $L_{10}$ of polystyrene cemented to the positive lens $L_9$, a positive lens $L_{11}$ of acryl, a negative lens $L_{12}$ of polystyrene spaced apart from the positive lens $L_{11}$ with a great air space therebetween, a positive lens $L_{13}$ of acryl cemented to the negative lens $L_{12}$, and a positive lens $L_{14}$ of acryl.

Figure 16A:
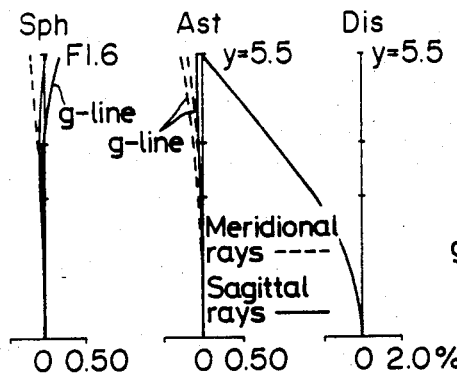
FIGS. 16A-16C show the light ray aberrations in the fourth embodiment in the same manner as FIG. 2.
Figure 16B:
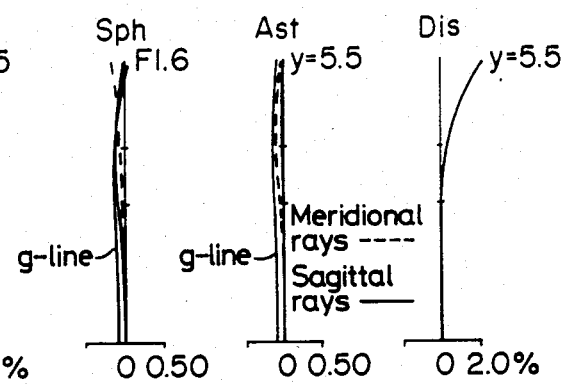
Figure 16C:
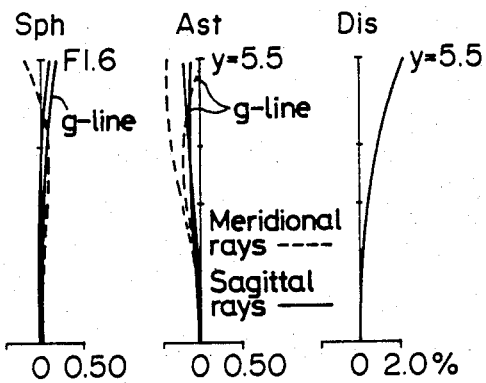
Figure 17:
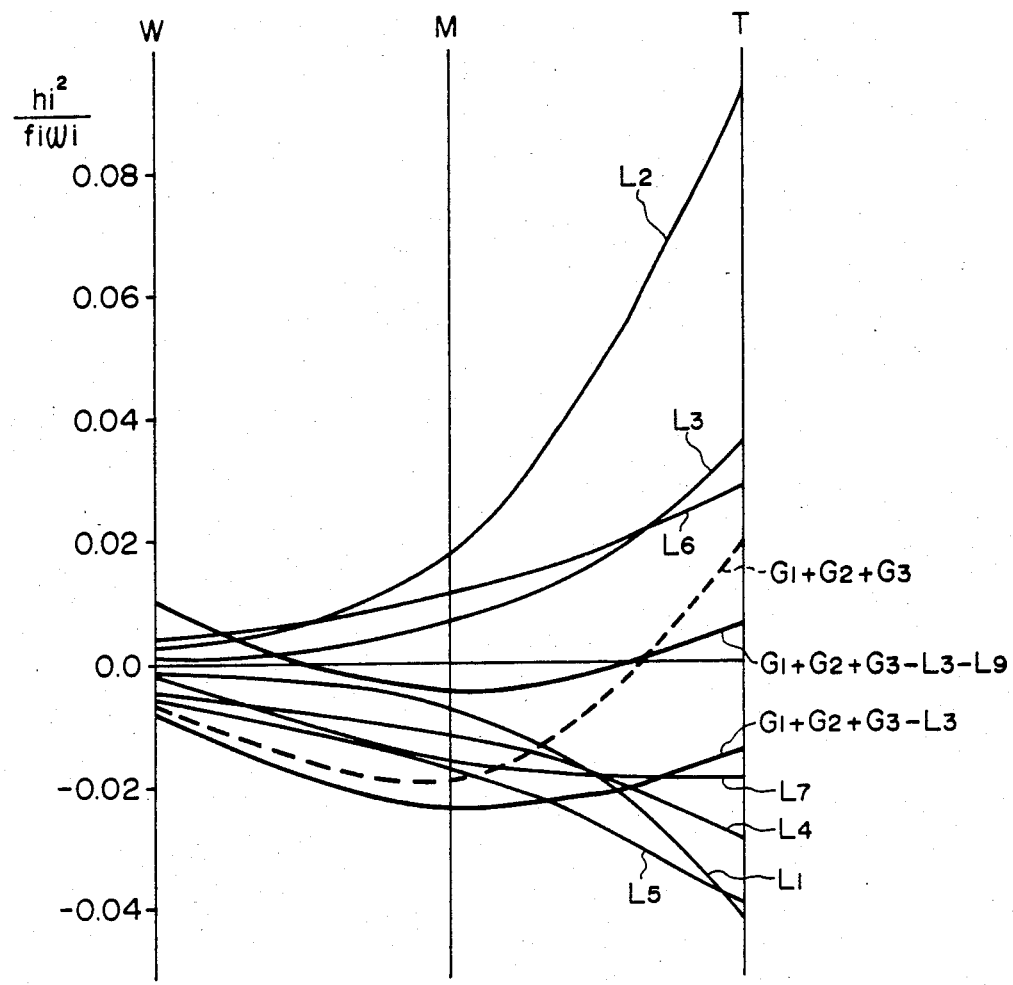
FIG. 17 shows the characteristic curve of each lens in the fourth embodiment similar to FIG. 12.

The numerical data of the fourth embodiment will be shown in Table 7 below, and the light ray aberrations therein are shown in FIG. 16. Also, the values of the thermal aberration coefficients in the magnification changing system of the present embodiment will be shown in Table 8 below. It can be seen from Table 8 that where all the lens elements of the magnification changing system are formed of organic glass, the lens element having substantially the same amount of variation as the amount of variation $\Delta V_S$ in the thermal aberration coefficient of the entire magnification changing system is the third lens $L_3$ or the sixth lens $L_6$. Accordingly, it can be seen that the fluctuation of the thermal aberration by zooming can be substantially corrected by forming one of the third lens $L_3$ and the sixth lens $L_6$ of inorganic glass. As regards the amount of variation in the thermal aberration coefficient between the shortest focal length condition and the longest focal length condition, that of the sixth lens $L_6$ is more approximate to the amount of variation $\Delta V_S$ of the entire magnification changing system than that of the third lens $L_3$. However, as can be seen from the characteristic curves of FIG. 17, the characteristic ($G_1+G_2+G_3$) of the entire magnification changing system is reduced in the intermediate focal length condition as indicated by a third dotted line and therefore, in the manner of variation, the characteristic of the third lens $L_3$ is more approximate to the characteristic of the entire magnification changing system. Therefore, in the present embodiment, the third lens $L_3$ is formed of inorganic glass. At this time, the characteristic of the magnification changing system becomes $G_1+G_2+G_3−L_3$ as indicated by the lower thick solid line in FIG. 17. In this condition, the amount of variation over the entire range of the focal length is small but generally negative. That is, it includes much of negative direct current component. Correction of this direct current component, as described in connection with the third embodiment, can be accomplished by the fourth group $G_4$ as a master lens. That is, in the present embodiment, the second positive lens $L_9$ in the fourth group $G_4$ is formed of inorganic glass, whereby correction of the direct current component is effected. In this case, the thermal aberrations of the fourth group itself are combined so as to have a positive direct current component by forming the lenses other than the positive lens $L_9$ of plastics (organic glass). As a result, the variation characteristic of the thermal aberration coefficient by zooming becomes $G_1+G_2+G_3-L_3-L_9$ and, as represented by the upper thick solid line in FIG. 17, the thermal aberration coefficient varies only slightly about the zero level and is corrected very well.

substituting inorganic glass for one lens in the magnification changing system and one lens in the master lens system.

Figure 20:
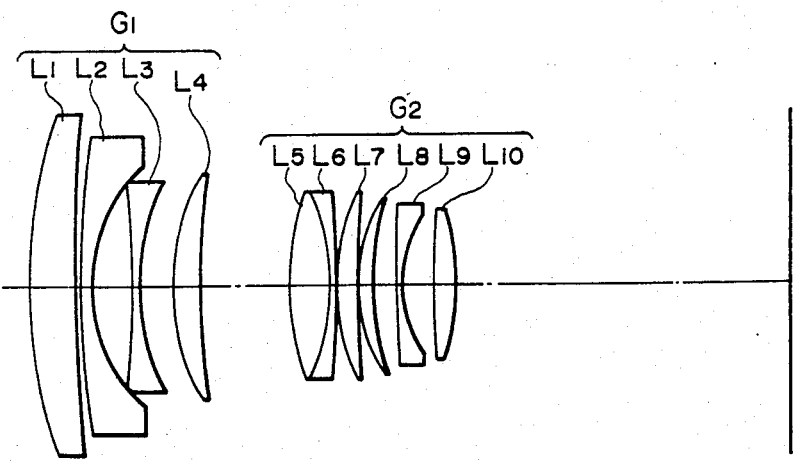
FIG. 20 shows the lens construction according to a fifth embodiment.

A fifth embodiment of the present invention will now be described. The fifth embodiment is a two-group zoom lens of zoom ratio 2 and F-number 3.5 for single lens reflex cameras which comprises a divergent first group $G_1$ and a convergent second group $G_2$ and in which magnification change is accomplished by both of the two groups being moved along the optical axis. In the specific lens construction of the present embodiment, as shown in FIG. 20, the first group $G_1$ comprises

TABLE 7

(Fourth Embodiment)
Focal length f = 11.5~69, Zoom ratio 6, F-number 1.6 Image height y = 5.5

| Radius of curvature | | Center thickness and air space | | Refractive index | | Abbe number | | Thermal dispersion number $\omega_j$ | | | |
|---|---|---|---|---|---|---|---|---|---|---|---|
| $r_1$ | 145.120 | $d_1$ | 1.0 | $n_1$ | 1.5914 | $\nu_1$ | 31.0 | $\omega_1$ | 77.3 | $L_1$ | ⎫ |
| $r_2$ | 38.616 | $d_2$ | 14.0 | $n_2$ | 1.4911 | $\nu_2$ | 56.6 | $\omega_2$ | 69.1 | $L_2$ | ⎬ $G_1$ |
| $r_3$ | −95.884 | $d_3$ | 0.1 | | | | | | | | |
| $r_4$ | 37.672 | $d_4$ | 4.5 | $n_3$ | 1.5186 | $\nu_3$ | 70.1 | $\omega_3$ | 0.0 | $L_3$ | ⎭ |
| $r_5$ | 94.187 | $d_5$ | variable | | | | | | | | |
| $r_6$ | −86.661 | $d_6$ | 1.0 | $n_4$ | 1.4911 | $\nu_4$ | 56.6 | $\omega_4$ | 69.1 | $L_4$ | ⎫ |
| $r_7$ | 14.605 | $d_7$ | 4.5 | | | | | | | | |
| $r_8$ | −33.050 | $d_8$ | 1.2 | $n_5$ | 1.4911 | $\nu_5$ | 56.6 | $\omega_5$ | 69.1 | $L_5$ | ⎬ $G_2$ |
| $r_9$ | 12.471 | $d_9$ | 2.8 | $n_6$ | 1.5914 | $\nu_6$ | 31.0 | $\omega_6$ | 77.3 | $L_6$ | ⎭ |
| $r_{10}$ | 61.485 | $d_{10}$ | variable | | | | | | | | |
| $r_{11}$ | −15.790 | $d_{11}$ | 1.0 | $n_7$ | 1.4911 | $\nu_7$ | 56.6 | $\omega_7$ | 69.1 | $L_7$ | $G_3$ |
| $r_{12}$ | −55.764 | $d_{12}$ | variable | | | | | | | | |
| $r_{13}$ | −61.301 | $d_{13}$ | 2.84 | $n_8$ | 1.4911 | $\nu_8$ | 56.6 | $\omega_8$ | 69.1 | $L_8$ | ⎫ |
| $r_{14}$ | −23.745 | $d_{14}$ | 0.1 | | | | | | | | |
| $r_{15}$ | 229.535 | $d_{15}$ | 7.77 | $n_9$ | 1.5014 | $\nu_9$ | 56.5 | $\omega_9$ | 0.0 | $L_9$ | |
| $r_{16}$ | −14.609 | $d_{16}$ | 1.0 | $n_{10}$ | 1.5914 | $\nu_{10}$ | 31.0 | $\omega_{10}$ | 77.3 | $L_{10}$ | |
| $r_{17}$ | −35.567 | $d_{17}$ | 0.09 | | | | | | | | |
| $r_{18}$ | 31.960 | $d_{18}$ | 4.74 | $n_{11}$ | 1.4911 | $\nu_{11}$ | 56.6 | $\omega_{11}$ | 69.1 | $L_{11}$ | ⎬ $G_4$ |
| $r_{19}$ | −151.061 | $d_{19}$ | 27.274 | | | | | | | | |
| $r_{20}$ | 38.343 | $d_{20}$ | 1.0 | $n_{12}$ | 1.5914 | $\nu_{12}$ | 31.0 | $\omega_{12}$ | 77.3 | $L_{12}$ | |
| $r_{21}$ | 10.013 | $d_{21}$ | 6.06 | $n_{13}$ | 1.4911 | $\nu_{13}$ | 56.6 | $\omega_{13}$ | 69.1 | $L_{13}$ | |
| $r_{22}$ | −124.764 | $d_{22}$ | 0.09 | | | | | | | | |
| $r_{23}$ | 11.817 | $d_{23}$ | 2.0 | $n_{14}$ | 1.4911 | $\nu_{14}$ | 56.6 | $\omega_{14}$ | 69.1 | $L_{14}$ | ⎭ |
| $r_{24}$ | 15.829 | $B_f$ | 5.39 | | | | | | | | |

| | $f_W = 11.5$ | $f_M = 28$ | $f_T = 69$ |
|---|---|---|---|
| $d_5$ | 2.785 | 23.156 | 35.787 |
| $d_{10}$ | 36.733 | 13.717 | 3.733 |
| $d_{12}$ | 3.419 | 6.610 | 3.418 |

TABLE 8

| | | W | T | ΔV | |
|---|---|---|---|---|---|
| | $L_1$ | −0.00132 | −0.04385 | −0.04253 | PS |
| | $L_2$ | 0.0028 | 0.09302 | 0.09022 | PMMA |
| $G_1$ | $L_3$ | 0.00105 | 0.03482 | 0.03377 | PMMA |
| | | | | = $\Delta V_x$ | |
| | $L_4$ | −0.00481 | −0.03035 | −0.02554 | PMMA |
| $G_2$ | $L_5$ | −0.00652 | −0.0411 | −0.03458 | PMMA |
| | $L_6$ | 0.00433 | 0.02728 | 0.02295 | PS |
| $G_3$ | $L_7$ | −0.00188 | −0.01987 | −0.01799 | PMMA |
| Total | | −0.00635 | 0.01995 | 0.0263 = $\Delta V_s$ | |
| ($G_1 + G_2 + G_3$) | | | | | |
| $G_1 + G_2 + G_3 - L_3$ | | −0.0074 | −0.001487 | −0.00747 | |
| $L_9$ in master lens $G_4$ | | −0.02 | −0.02 | 0 | PS |
| After correction | | 0.0126 | 0.00513 | −0.00747 | |
| $G_1 + G_2 +$ | | | | | |
| $G_3 - L_3 -$ | | | | | |
| $L_9$ | | | | | |
| (4th Embodiment) | | | | | |

Figure 18A:
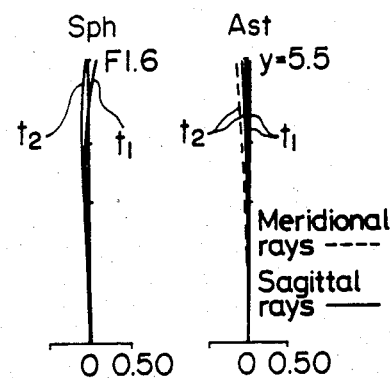
FIGS. 18A-18C show the aberrations in the fourth embodiment after correction of thermal aberration in the same manner as FIG. 4.
Figure 18B:
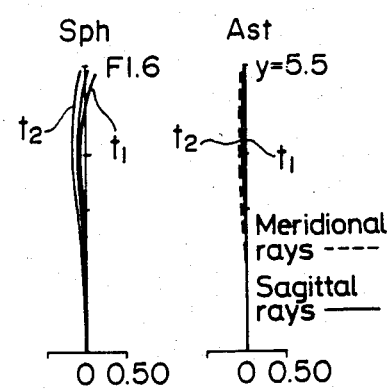
Figure 18C:
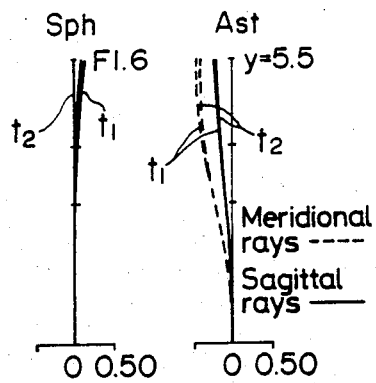
Figure 19A:
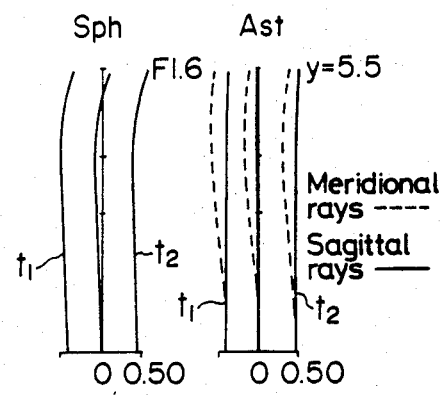
FIGS. 19A-19C show the aberrations in the fourth embodiment before correction of thermal aberration in the same manner as FIG. 5.
Figure 19B:
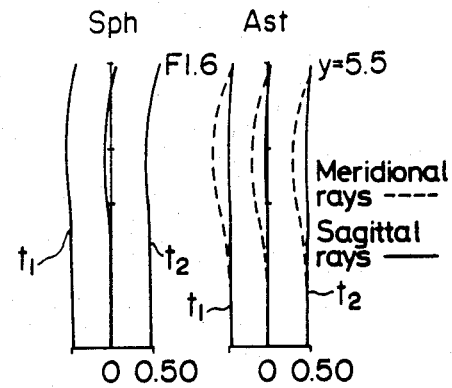
Figure 19C:
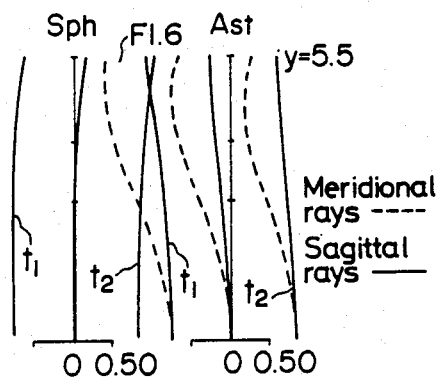

FIG. 18 shows the aberrations in the fourth embodiment after correction of the thermal aberration, and FIG. 19 shows the aberrations in the fourth embodiment before correction of the thermal aberration. It is found from the comparison between FIGS. 18 and 19 that in the zoom lens of the present embodiment, the thermal aberration is very well corrected simply by a positive lens $L_1$ of acryl-PMMA, two negative lenses $L_2$ and $L_3$ of acryl, and a positive meniscus lens $L_4$ of polystyrene PS, and the second group $G_2$ comprises a positive lens $L_5$ of inorganic glass, a negative lens $L_6$ of polystyrene cemented to the positive lens $L_5$, a positive lens $L_7$ of acryl, a positive meniscus lens $L_8$ of inorganic glass, a negative lens $L_9$ of inorganic glass and a positive lens $L_{10}$ of acryl.

Figure 21A:
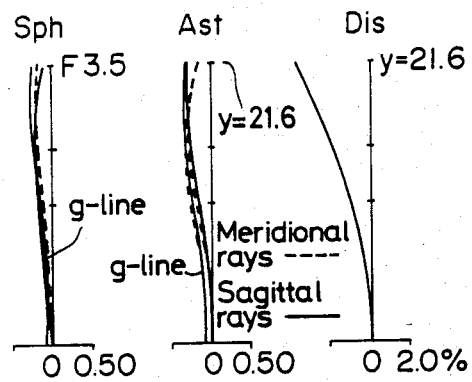
FIGS. 21A-21C show the light ray aberrations in the fifth embodiment in the same manner as FIG. 2.
Figure 21B:
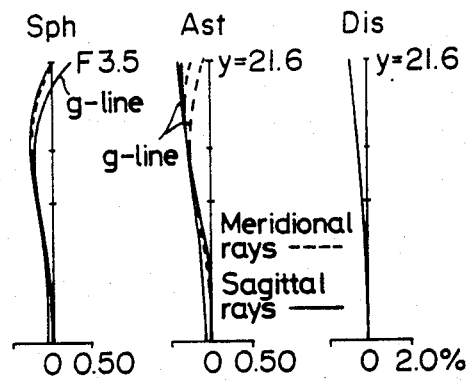
Figure 21C:
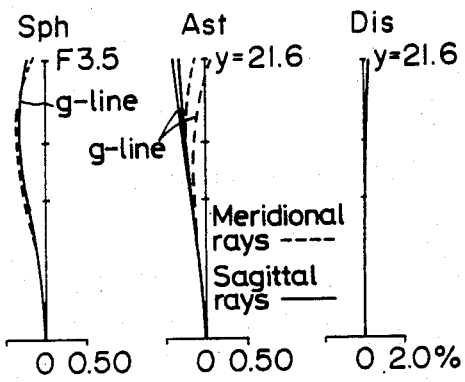

The numerical data of the fifth embodiment will be shown in Table 9 below and the light ray aberrations therein are shown in FIG. 21. The values of the thermal aberration coefficients with respect to a case where all the lens elements of the entire system are formed of organic glass will be shown in Table 10 below. It can be seen from Table 10 that the lens element having the same degree of amount of variation ΔV as the amount of variation $\Delta V_S$ in the thermal aberration coefficient of the entire system is the seventh lens $L_7$. If this seventh lens $L_7$ is formed of inorganic glass, the amount of variation in the thermal aberration coefficient of the entire system can be reduced to almost zero. However, the absolute amount of the thermal aberration coefficient is great, and a great direct current component remains. Moreover, in a zoom lens having no master lens system like the present embodiment, the direct current component cannot simply be corrected as in the above-described embodiments. Accordingly, it is necessary to correct the direct current component by combining at least two lens elements. So, in the present embodiment, three lens elements are combined to correct the variation component of the thermal aberration coefficient and the direct current component at the same time. That is, the fifth lens $L_5$, the eighth lens $L_8$ and the ninth lens $L_9$ are formed of inorganic glass. As shown in Table 10, where these three lens elements are formed of organic glass, the amount of variation in their total thermal aberration coefficient ($L_5+L_8+L_9$) is of about the same degree as the amount of variation $\Delta V_S$ in the thermal aberration coefficient ($G_1+G_2$) of the entire system and the thermal aberration coefficient ($G_1+G_2-L_5-L_8-L_9$) after correction is a slight negative variation and the absolute amount thereof becomes a very small positive value.

Figure 23A:
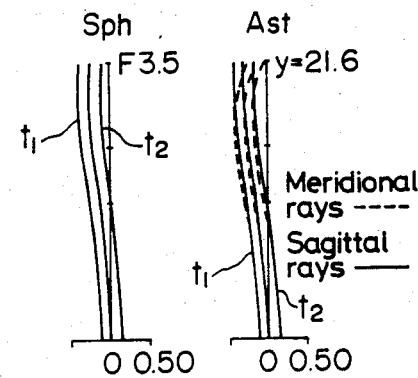
FIGS. 23A-23C show the aberrations in the fifth embodiment after correction of thermal aberration in the same manner as FIG. 4.
Figure 23B:
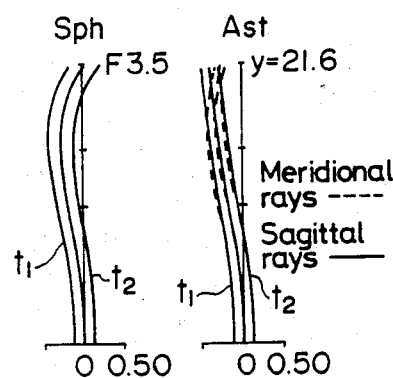
Figure 23C:
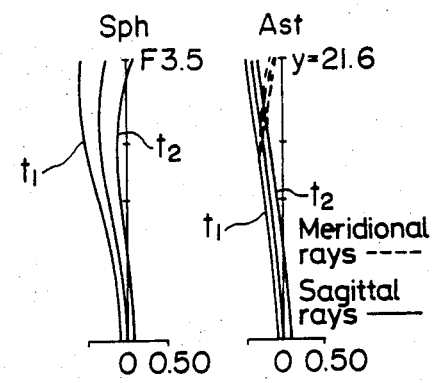
Figure 24A:
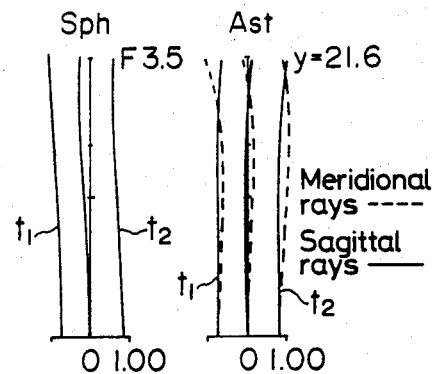
FIGS. 24A-24C show the aberrations in the fifth embodiment before correction of thermal aberration in the same manner as FIG. 5.
Figure 24B:
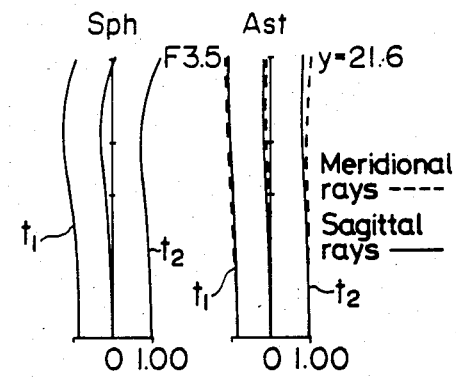
Figure 24C:
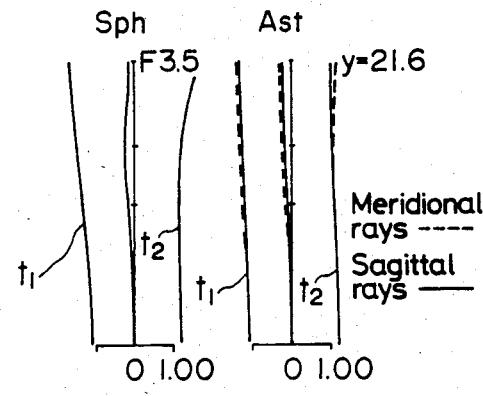

FIG. 22 shows the thermal aberration coefficient characteristic of each lens in the fifth embodiment. A single lens having a characteristic similar to the characteristic ($G_1+G_2$) of the entire system before correction indicated by the thick dotted line in FIG. 22 does not exist, but it will be seen that the characteristic ($L_5+L_8+L_9$) of the sum of the fifth lens $L_5$, the eighth lens $L_8$ and the ninth lens $L_9$ is of the same degree as the characteristic of the entire system. Accordingly, in the case of the present embodiment in which three lenses, i.e., the fifth, eighth and ninth lenses, are formed of inorganic glass, the thermal aberration coefficient characteristic of the entire system is such as indicated by the thick line $G_1+G_2-L_5-L_8-L_9$ in the figure and although it is somewhat of a positive value, it is corrected very well. FIG. 23 shows the aberrations in the fifth embodiment after correction of the thermal aberration, and FIG. 24 shows the aberrations in the fifth embodiment before correction of the thermal aberration. As shown in FIG. 24, before correction, by the temperature variations of $-10°$ C. and $50°$ C., the focus position is changed by about 1.6 mm in the shortest focal length condition and is changed by as much as 2.5 mm in the longest focal length condition, whereas after correction, as shown in FIG. 23, the change of the focus position is less than 0.5 in each focal length condition and moreover, it is apparent that a practically sufficient imaging performance is maintained as a photographic lens for 35 mm single lens reflex cameras.

In the fifth embodiment, the thermal aberration has been corrected by forming the fifth, eighth and ninth lenses $L_5$, $L_8$ and $L_9$ of inorganic glass. However, this is not restrictive, and as additionally shown in Table 10 and FIG. 22, the fourth lens $L_4$ and the tenth lens $L_{10}$ may be formed of inorganic glass or the seventh lens $L_7$ and the eighth lens $L_8$ may be formed of inorganic glass.

TABLE 9

(Fifth Embodiment)
Focal length f = 35~70, Zoom ratio 2, F-number 3.5 Image height y = 21.6

| Radius of curvature | | Center thickness and air space | | Refractive index | | Abbe number | | Thermal dispersion number $\omega_i$ | | | |
|---|---|---|---|---|---|---|---|---|---|---|---|
| $r_1$ | 67.533 | $d_1$ | 8.2 | $n_1$ | 1.4911 | $\nu_1$ | 57.6 | $\omega_1$ | 69.1 | $L_1$ | |
| $r_2$ | 293.759 | $d_2$ | 0.7 | | | | | | | | |
| $r_3$ | 140.240 | $d_3$ | 1.5 | $n_2$ | 1.4911 | $\nu_2$ | 57.6 | $\omega_2$ | 69.1 | $L_2$ | |
| $r_4$ | 22.775 | $d_4$ | 7.0 | | | | | | | | $G_1$ |
| $r_5$ | -175.452 | $d_5$ | 1.5 | $n_3$ | 1.4911 | $\nu_3$ | 57.6 | $\omega_3$ | 69.1 | $L_3$ | |
| $r_6$ | 32.226 | $d_6$ | 5.7 | | | | | | | | |
| $r_7$ | 33.139 | $d_7$ | 3.9 | $n_4$ | 1.5914 | $\nu_4$ | 31.0 | $\omega_4$ | 77.3 | $L_4$ | |
| $r_8$ | 89.304 | $d_8$ | variable | | | | | | | | |
| $r_9$ | 49.613 | $d_9$ | 6.5 | $n_5$ | 1.5014 | $\nu_5$ | 56.5 | $\omega_5$ | 0.0 | $L_5$ | |
| $r_{10}$ | -28.258 | $d_{10}$ | 1.0 | $n_6$ | 1.5914 | $\nu_6$ | 31.0 | $\omega_6$ | 77.3 | $L_6$ | |
| $r_{11}$ | -123.425 | $d_{11}$ | 0.1 | | | | | | | | |
| $r_{12}$ | 30.907 | $d_{12}$ | 3.5 | $n_7$ | 1.4911 | $\nu_7$ | 57.6 | $\omega_7$ | 69.1 | $L_7$ | |
| $r_{13}$ | 188.671 | $d_{13}$ | 0.1 | | | | | | | | $G_2$ |
| $r_{14}$ | 22.455 | $d_{14}$ | 2.5 | $n_8$ | 1.6583 | $\nu_8$ | 57.3 | $\omega_8$ | 0.0 | $L_8$ | |
| $r_{15}$ | 39.238 | $d_{15}$ | 4.0 | | | | | | | | |
| $r_{16}$ | 209.734 | $d_{16}$ | 1.0 | $n_9$ | 1.7234 | $\nu_9$ | 38.0 | $\omega_9$ | 0.0 | $L_9$ | |
| $r_{17}$ | 18.146 | $d_{17}$ | 5.2 | | | | | | | | |
| $r_{18}$ | 106.970 | $d_{18}$ | 3.8 | $n_{10}$ | 1.4911 | $\nu_{10}$ | 57.6 | $\omega_{10}$ | 69.1 | $L_{10}$ | |
| $r_{19}$ | -35.294 | $B_f$ | variable | | | | | | | | |

| | $f_W = 35$ | $f_M = 51$ | $f_T = 70$ |
|---|---|---|---|
| $d_8$ | 34.338 | 15.595 | 1.538 |
| $B_f$ | 38.465 | 57.208 | 71.265 |

TABLE 10

| | | W | T | $\Delta V$ | |
|---|---|---|---|---|---|
| $G_1$ | $L_1$ | 0.0027 | 0.00959 | 0.00689 | PMMA |
| | $L_2$ | -0.0078 | -0.02763 | -0.01983 | PMMA |
| | $L_3$ | -0.0074 | -0.02637 | -0.01897 | PMMA |
| | $L_4$ | 0.00627 | 0.023 | 0.01673 | PS |
| $G_2$ | $L_5$ | 0.02896 | 0.05169 | 0.02273 | PMMA |
| | $L_6$ | -0.01046 | -0.01867 | -0.00821 | PS |
| | $L_7$ | 0.0105 | 0.01868 | 0.00817 | PMMA |
| | $L_8$ | 0.01297 | 0.02314 | 0.01017 | PMMA |
| | $L_9$ | -0.0125 | -0.04493 | -0.02343 | PS |
| | $L_{10}$ | 0.01274 | 0.02662 | 0.01388 | PMMA |
| Total ($G_1 + G_2$) | | 0.02698 | 0.03512 | 0.00814 = $\Delta V_s$ | |
| $L_5 + L_8 + L_9$ | | 0.02043 | 0.0299 | 0.00947 = $\Delta V_x$ | |
| After correction $G_1 + G_2 - L_5 - L_8 - L_9$ (5th Embodiment) | | 0.00655 | 0.00522 | -0.00133 | |
| Other combinations in which chiefly the direct current component is offset | (-$L_4$) (-$L_{10}$) | 0.00797 | -0.0145 | -0.02247 | |
| | (-$L_7$) (-$L_8$) | 0.00351 | -0.0067 | -0.01021 | |

In these cases, the thermal aberration characteristics are $G_1+G_2-L_4-L_{10}$, $G_1+G_2-L_7-L_8$, respectively, as shown in FIG. 22, and as compared with the case of the present embodiment $(G_1+G_2-L_5-L_8-L_9)$, the amount of variation is great but is a variation about the zero level and the correction of the direct current component is better.

In the foregoing, at least one of the lens elements in at least one of the lens groups forming the magnification changing system of the zoom lens has been formed of inorganic glass. This is particularly effective for a zoom lens having a great zoom magnification of about 6, but in a zoom lens having a small zoom magnification of about 3, the focus change resulting from a temperature variation created in the magnification changing system is sometimes not so great and, in such case, the correction of the magnification changing system may be omitted and the zoom magnification can be well made approximate to the vicinity of zero by controlling only the direct current component of the master system or can be corrected by putting it into the positive and the negative. In this case, depending on the temperature in use, the focal plane may fluctuate during zooming, but if the amount of such fluctuation is suppressed to the vicinity of the depth of focus, there will be no adverse effect.

Accordingly, in a zoom lens having a magnification changing system and a master system, at least one of the positive lenses forming the master system may be formed of inorganic glass, whereby correction of the temperature of the entire system can be accomplished by the master system alone.

To keep the balance of focus fluctuation, the master lens system must be constructed so as to cancel the direct current component created in the magnification changing system. Of course, it is necessary to well correct not only the thermal aberration but also chromatic aberration and it is important to control the thermal aberration while correcting the chromatic aberration. It is also necessary to hold the power as a master system. Assuming that the master system comprises u organic glass lenses, that the focal lengths of the respective lenses are $f_1, f_2, \ldots, f_i, \ldots, f_u$, that the refractive indices of the respective lenses are $n_1, n_2, \ldots, n_i, \ldots, n_u$, that the thermal dispersion numbers of the respective lenses are $\omega_1, \omega_2, \ldots, \omega_i, \ldots, \omega_u$ and that the heights of the paraxial rays in the respective lenses are $h_1, h_2, \ldots, h_i, \ldots, h_u$, the thermal aberration coefficient $Tm$, the chromatic aberration $Cm$ and the power (refractive power) $Pm$ with regard to the master system may be expressed as follows:

$$\sum_{i=1}^{u} \frac{h_i^2}{f_i \omega_i} = Tm \tag{5}$$

$$\sum_{i=1}^{u} \frac{h_i^2}{f_i n_i} = Cm \tag{6}$$

$$\sum_{i=1}^{u} \frac{h_i}{f_i} = Pm \tag{7}$$

There is the necessity of effecting a correction in which the chromatic aberration $Cm$ and the thermal aberration coefficient $Tm$ are balanced to each other while keeping the power $Pm$ of the master system at a predetermined value and moreover, there is the necessity of balancing them so that they do not fluctuate very greatly during the zooming from the short focal length end to the long focal length end. As regards the thermal aberration coefficient $Tv$ of the magnification changing system, for example, in the 3-time zoom lens shown as the first embodiment, between the low temperature $t_1 = -10°$ C. and the high temperature $t_2 = 50°$ C. with the standard temperature $t = 20°$ C., $Tv(W) = 0.00759$ at the short focal length end and $Tv(T) = 0.02413$ at the long focal length end and thus, there has been perceived a difference of 0.01654 therebetween. By variously changing the parameters of the master lens (curvature, inter-surface spacing, power arrangement, etc.), the fluctuation component by zooming cannot be eliminated, but by correcting the direct current component, the amount of fluctuation can be made approximate to 0 or can be put into the positive and the negative to thereby reduce the substantial detriment. This balance, unlike the balance accomplished by a fixed focal length lens, may lead to a result that at the short focal length end, the value of $Tm$ is conversely brought out in the negative sense. In this case, however, the positive and negative are just balanced when viewed as the whole zooming.

In such a construction, between the low temperature $t_1 = -10°$ C. and the high temperature $t_2 = 50°$ C. with 20° C. as the standard temperature, it is desirable that the thermal aberration coefficient $Tm$ of the master system be in the range of $$-0.02 \leq Tm \leq 0.01 \tag{8}$$

At this time, it is also desirable to design the zoom lens such that the thermal aberration coefficient $Ttot$ of the entire lens system is $$|Ttot(W)| \leq 0.01 \tag{9}$$

in the shortest focal length condition and $$0.005 \leq Ttot(T) \leq 0.03 \tag{10}$$

in the longest focal condition.

The value $Ttot(W)$ of the thermal aberration coefficient of the entire lens system in the shortest focal length condition is the sum total of the second term in the parentheses at the right side of the aforementioned equation (1), and the value $Ttot(T)$ in the longest focal length condition is the sum total of the first term in the parentheses at the right side of the same equation (1). That is, they are respectively defined as:

$$Ttot(W) = \sum_{i=1}^{k} \frac{h_i^{W2}}{f_i \omega_i}$$

$$Ttot(T) = \sum_{i=1}^{k} \frac{h_i^{T2}}{f_i \omega_i}$$

If all the lens elements of the lens system are formed of organic glass, the entire system will have a positive refractive power and necessarily the thermal aberration coefficient of the entire system will have a positive value and, if the lens system is a zoom lens, said thermal aberration coefficient will have a value comprising a certain direct current component plus the fluctuation component by magnification change. If the thermal aberration coefficients of the individual lenses of organic glass forming the master system of the zoom lens are compared with the direct current component of the thermal aberration coefficient by the entire system and the lens element in which the coefficient value of one or more lenses in the master system is substantially equal to the direct current component of the entire system is replaced by inorganic glass, the direct current component can be corrected. The value of the resultant thermal aberration coefficient Tm of the master system is in the range of formula (8), whereby good correction of the thermal aberration of the entire zoom lens system becomes possible. If the lower limit of formula (8) is exceeded, the direct current component will be overcorrected and, if the upper limit of this formula is exceeded, the direct current component will be undercorrected and it will be difficult to correct the fluctuation of the thermal aberration resulting from magnification change to a practically sufficient value. It is most suitable for correction of the thermal aberration of the zoom lens that the thermal aberration coefficient Ttot of the entire system assumes a negative or a positive value about zero in the shortest focal length condition as expressed by the condition of formula (9) and assumes a somewhat great positive value in the longest focal length condition as expressed by the condition of formula (10). If these conditions are not satisfied, the balance of the thermal aberration will be destroyed and degradation of the image will be unavoidable.

Further, in such a construction, with regard to the lenses of inorganic glass provided in the master system, the Abbe number $\nu d$ thereof should desirably be $\nu d > 50$ for the purpose of good correction of chromatic aberration as shown in formula (6). Also, a lens of organic glass having a greater refractive power has a greater inherent thermal aberration coefficient and therefore, to correct the positive direct current component of the thermal aberration coefficient created in the entire system, it is advantageous that the positive lens element of greater refractive power in the master system is formed of inorganic glass.

An embodiment will now be described in which inorganic glass is used only in the master system.

Figure 25:
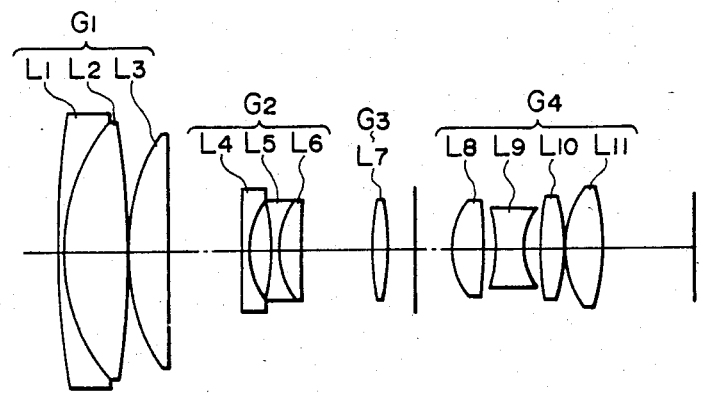
FIG. 25 shows the construction of the zoom lens according to a sixth embodiment of the present invention.

A sixth embodiment of the present invention is basically a so-called four-group zoom lens, and more particularly a zoom lens system of zoom ratio 3 and F-number 1.8 which, as shown in FIG. 25, has, in succession from the object side, a positive first group $G_1$ as a focusing group, a negative second group $G_2$ as a variator, a positive third group $G_3$ as a compensator, and a positive fourth group $G_4$ as a master system. The first, second and third groups together constitute a magnification changing system. The first group $G_1$ comprises a negative lens $L_1$ formed of polystyrene PS, a positive lens $L_2$ of acryl (PMMA) cemented to the negative lens $L_1$, and a positive lens $L_3$ formed of acryl, the second group $G_2$ comprises a negative lens $L_4$ formed of acryl, a negative lens $L_5$ formed of acryl, and a positive lens $L_6$ of polystyrene cemented to the negative lens $L_5$, and the third group $G_3$ comprises a positive lens $L_7$ formed of acryl. The fourth group $G_4$ which is the master system comprises a positive lens $L_8$ formed of inorganic glass, a negative lens $L_9$ formed of polystyrene, and two positive lenses $L_{10}$ and $L_{11}$ formed of acryl.

The numerical data of the sixth embodiment will be shown in Table 11 below. In this table, the thermal dispersion number $\omega_i$ of each lens element will also be shown. This thermal dispersion number $\omega_i$ is a value calculated at the standard temperature $t = 20°$ C., the low temperature $t_1 = -10°$ C. and the high temperature $t_2 = 50°$ C.

TABLE 11

(Sixth Embodiment)
Focal length f = 15~45, Zoom ratio 3, F-number 1.8 Image height y = 5.5

| Radius of curvature | | Center thickness and air space | | Refractive index | | Abbe number | | Thermal dispersion factor $\omega_i$ | | | |
|---|---|---|---|---|---|---|---|---|---|---|---|
| $r_1$ | 126.5 | $d_1$ | 1.0 | $n_1$ | 1.5914 | $\nu_1$ | 31.0 | $\omega_1$ | 77.3 | $L_1$ | |
| $r_2$ | 28.37 | $d_2$ | 10.5 | $n_2$ | 1.4911 | $\nu_2$ | 56.6 | $\omega_2$ | 69.1 | $L_2$ | $G_1$ |
| $r_3$ | −121.659 | $d_3$ | 0.1 | | | | | | | | |
| $r_4$ | 30.654 | $d_4$ | 6.3 | $n_3$ | 1.4911 | $\nu_3$ | 56.6 | $\omega_3$ | 69.1 | $L_3$ | |
| $r_5$ | 473.205 | $d_5$ | variable | | | | | | | | |
| $r_6$ | −627.475 | $d_6$ | 1.0 | $n_4$ | 1.4911 | $\nu_4$ | 56.6 | $\omega_4$ | 69.1 | $L_4$ | |
| $r_7$ | 11.685 | $d_7$ | 4.0 | | | | | | | | |
| $r_8$ | −24.512 | $d_8$ | 1.0 | $n_5$ | 1.4911 | $\nu_5$ | 56.6 | $\omega_5$ | 69.1 | $L_5$ | $G_2$ |
| $r_9$ | 11.559 | $d_9$ | 3.5 | $n_6$ | 1.5914 | $\nu_6$ | 31.0 | $\omega_6$ | 77.3 | $L_6$ | |
| $r_{10}$ | 85.329 | $d_{10}$ | variable | | | | | | | | |
| $r_{11}$ | 51.959 | $d_{11}$ | 2.2 | $n_7$ | 1.4911 | $\nu_7$ | 56.6 | $\omega_7$ | 69.1 | $L_7$ | $G_3$ |
| $r_{12}$ | −44.546 | $d_{12}$ | variable | | | | | | | | |
| $r_{13}$ | 10.854 | $d_{13}$ | 11.3 | $n_8$ | 1.4978 | $\nu_8$ | 82.3 | $\omega_8$ | 0.0 | $L_8$ | |
| $r_{14}$ | −139.132 | $d_{14}$ | 2.13 | | | | | | | | |
| $r_{15}$ | −21.792 | $d_{15}$ | 4.8 | $n_9$ | 1.5914 | $\nu_9$ | 31.0 | $\omega_9$ | 77.3 | $L_9$ | $G_4$ |
| $r_{16}$ | 9.605 | $d_{16}$ | 2.45 | | | | | | | | |
| $r_{17}$ | 34.579 | $d_{17}$ | 4.3 | $n_{10}$ | 1.4911 | $\nu_{10}$ | 56.6 | $\omega_{10}$ | 69.1 | $L_{10}$ | |
| $r_{18}$ | −29.492 | $d_{18}$ | 0.2 | | | | | | | | |
| $r_{19}$ | 14.981 | $d_{19}$ | 6.0 | $n_{11}$ | 1.4911 | | 56.6 | $\omega_{11}$ | 69.1 | $L_{11}$ | |
| $r_{20}$ | −32.857 | | | | | | | | | | |

| | $f_W$ = 15.06 | $f_M$ = 25.64 | $f_T$ = 43.63 |
|---|---|---|---|
| $d_5$ | 1.8375 | 12.4237 | 18.6442 |
| $d_{10}$ | 18.6068 | 12.1419 | 1.1399 |
| $d_{12}$ | 8.8983 | 4.7770 | 9.5584 |

$B_f$ = 13.64

In the sixth embodiment, before correction of the thermal aberration, that is, where the eighth lens $L_8$ is formed of acryl and all lens elements are formed of inorganic glass, the thermal aberration coefficient of the entire system is Ttot(W)=0.03981 in the shortest focal length condition and Ttot(T)=0.0565 in the longest focal length condition, both of these being values which are great in the positive sense. So, in the present embodiment, as the positive lens in the master system, the eighth lens $L_8$ is formed of inorganic glass and as a result, the thermal aberration coefficient of the fourth group as the master system has been reduced from $Tm=0.03334$ before correction to $Tm=0.00037$ and in the entire system, it has become $Ttot(W)=0.00684$ and $Ttot(T)=0.02353$ and thus, the fluctuation component could not be eliminated but the absolute value thereof could be made into a considerably small value.

Figure 28A:
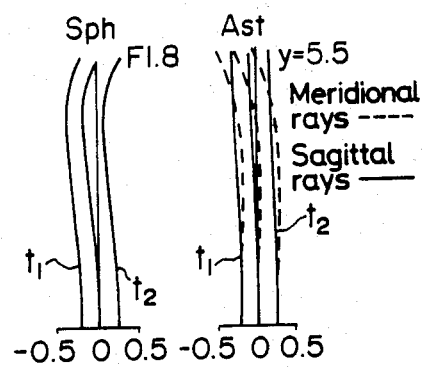
FIGS. 28A-28C show the aberrations before correction of thermal aberration.
Figure 28B:
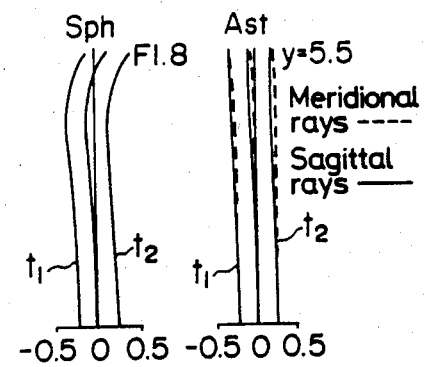
Figure 28C:
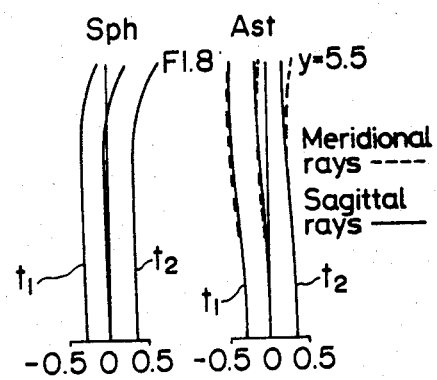

The light ray aberration in the sixth embodiment are shown in FIG. 26. FIG. 26A shows the shortest focal length condition, FIG. 26B shows the intermediate focal length condition, and FIG. 26C shows the longest focal length condition. In these figures, Sph represents spherical aberration, Ast represents astigmatism, and Dis represents distortion. The showing is made with the d-line ($\lambda=587.6$ nm) as the standard wavelength and by using the g-line ($\lambda=435.8$ nm) as the standard of correction of chromatic aberration. The effects of the correction of the thermal aberration of the present embodiment are shown in FIGS. 27 and 28. FIG. 27 shows the aberrations in the embodiment wherein the temperature aberration has been corrected, and FIG. 28 shows the aberrations before correction of the thermal aberration, that is, in a case where the eighth lens $L_8$ is formed of acryl and all the fourth group $G_4$ as the master system is formed of inorganic glass. In these figures, A shows the shortest focal length condition, B shows the intermediate focal length condition, C shows the longest focal length condition, Sph represents spherical aberration, Ast represents astigmatism, and Dis represents distortion. Also, the standard temperature is 20° C., the low temperature condition of $-10°$ C. is indicated by $t_1$, and the high temperature condition of 50° C. is indicated by $t_2$. It is apparent from these thermal aberration graphs that the zoom lens of the present embodiment suffers from less fluctuation of the focus position for a great temperature change from $-10°$ C. to 50° C. and moreover, maintains a practically sufficient imaging performance.

Figure 29:
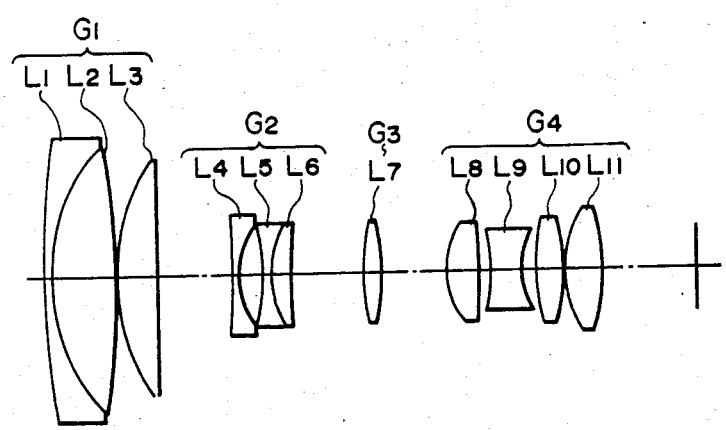
FIG. 29 shows the construction of the zoom lens according to a seventh embodiment.

In the sixth embodiment, a positive lens of inorganic glass is used in the master system, but one more positive lens may be formed of inorganic glass, whereby the thermal aberration can be better corrected. A seventh embodiment of the present invention is a zoom lens which uses two lenses of inorganic glass in the master system. In the seventh embodiment, as shown in FIG. 29, in addition to the eighth lens $L_8$, which has been formed of inorganic glass in the sixth embodiment, the eleventh lens $L_{11}$ which is a positive lens most adjacent to the image side is formed of inorganic glass. If the lens most adjacent to the image side is formed of inorganic glass, the interior inorganic glass lens can be protected. The numerical data of the seventh embodiment will be shown in Table 12 below.

TABLE 12

(Seventh Embodiment)
Focal length $f = 15\sim45$, Zoom ratio 3, F-number 1.8 Image height $y = 5.5$

| Radius of curvature | | Center thickness and air space | | Refractive index | | Abbe number | | Thermal dispersion factor $\omega_i$ | | |
|---|---|---|---|---|---|---|---|---|---|---|
| $r_1$ | 126.5 | $d_1$ | 1.0 | $n_1$ | 1.5914 | $\nu_1$ | 31.0 | $\omega_1$ | 77.3 | $L_1$ |
| $r_2$ | 28.37 | $d_2$ | 10.5 | $n_2$ | 1.4911 | $\nu_2$ | 56.6 | $\omega_2$ | 69.1 | $L_2$ |
| $r_3$ | $-121.659$ | $d_3$ | 0.1 | | | | | | | $G_1$ |
| $r_4$ | 30.654 | $d_4$ | 6.3 | $n_3$ | 1.4911 | $\nu_3$ | 56.6 | $\omega_3$ | 69.1 | $L_3$ |
| $r_5$ | 473.206 | $d_5$ | variable | | | | | | | |
| $r_6$ | $-627.475$ | $d_6$ | 1.0 | $n_4$ | 1.4911 | $\nu_4$ | 56.6 | $\omega_4$ | 69.1 | $L_4$ |
| $r_7$ | 11.685 | $d_7$ | 4.0 | | | | | | | |
| $r_8$ | $-24.512$ | $d_8$ | 1.0 | $n_5$ | 1.4911 | $\nu_5$ | 56.6 | $\omega_5$ | 69.1 | $L_5$ $G_2$ |
| $r_9$ | 11.56 | $d_9$ | 3.5 | $n_6$ | 1.5914 | $\nu_6$ | 31.0 | $\omega_6$ | 77.3 | $L_6$ |
| $r_{10}$ | 85.329 | $d_{10}$ | variable | | | | | | | |
| $r_{11}$ | 51.959 | $d_{11}$ | 2.2 | $n_7$ | 1.4911 | $\nu_7$ | 56.6 | $\omega_7$ | 69.1 | $L_7$-$G_3$ |
| $r_{12}$ | $-44.546$ | $d_{12}$ | variable | | | | | | | |
| $r_{13}$ | 10.854 | $d_{13}$ | 5.2 | $n_8$ | 1.4978 | $\nu_8$ | 82.3 | $\omega_8$ | 0.0 | $L_8$ |
| $r_{14}$ | $-139.132$ | $d_{14}$ | 2.13 | | | | | | | |
| $r_{15}$ | $-21.792$ | $d_{15}$ | 4.8 | $n_9$ | 1.5914 | $\nu_9$ | 31.0 | $\omega_9$ | 77.3 | $L_9$ |
| $r_{16}$ | 9.605 | $d_{16}$ | 2.45 | | | | | | | $G_4$ |
| $r_{17}$ | 34.579 | $d_{17}$ | 4.3 | $n_{10}$ | 1.4911 | $\nu_{10}$ | 56.6 | $\omega_{10}$ | 69.1 | $L_{10}$ |
| $r_{18}$ | $-29.492$ | $d_{18}$ | 0.2 | | | | | | | |
| $r_{19}$ | 14.981 | $d_{19}$ | 6.0 | $n_{11}$ | 1.5014 | $\nu_{11}$ | 56.6 | $\omega_{11}$ | 0.0 | $L_{11}$ |
| $r_{20}$ | $-32.857$ | | | | | | | | | |

| | $f_W = 15.06$ | $f_M = 25.64$ | $f_T = 43.63$ |
|---|---|---|---|
| $d_5$ | 1.8375 | 12.4237 | 18.6442 |
| $d_{10}$ | 18.6068 | 12.1419 | 1.1399 |
| $d_{12}$ | 8.8983 | 4.7770 | 9.5584 |
| | | $B_f = 13.64$ | |

In the seventh embodiment, the thermal aberration coefficient of the master system assumes a negative value, i.e., $Tm=0.01333$, and the thermal aberration coefficient of the entire system is $Ttot(W)=-0.00686$ in the shortest focal length condition and $Ttot(T)=0.00983$ in the longest focal length condition. The values of these thermal aberration coefficients together with the values in the sixth embodiment will be shown in Table 13 below.

TABLE 13

| | Shortest focal length ($f_W$) | Longest focal length ($f_T$) |
|---|---|---|
| Magnification changing system: Tv ($G_1 + G_2 + G_3$) | 0.00647 | 0.02316 |
| Master system: Tm ($G_4$) | 0.03334 | 0.03334 |
| Entire system: Ttot ($G_1 + G_2 + G_3 + G_4$) 6th Embodiment | 0.03981 | 0.05650 |
| Master system: Tm ($G_4 - L_8$) | 0.00037 | 0.00037 |
| Entire system: Ttot ($G_1 + G_2 + G_3 + G_4 - L_8$) 7th Embodiment | 0.00684 | 0.02353 |

TABLE 13-continued

| | Shortest focal length (f$_W$) | Longest focal length (f$_T$) |
|---|---|---|
| Master system: Tm (G$_4$ − L$_8$ −L$_{11}$) | −0.01333 | −0.01333 |
| Entire system: Ttot (G$_1$ + G$_2$ + G$_3$ + G$_4$ − L$_8$ − L$_{11}$) | −0.00686 | 0.00983 |

Figure 30:
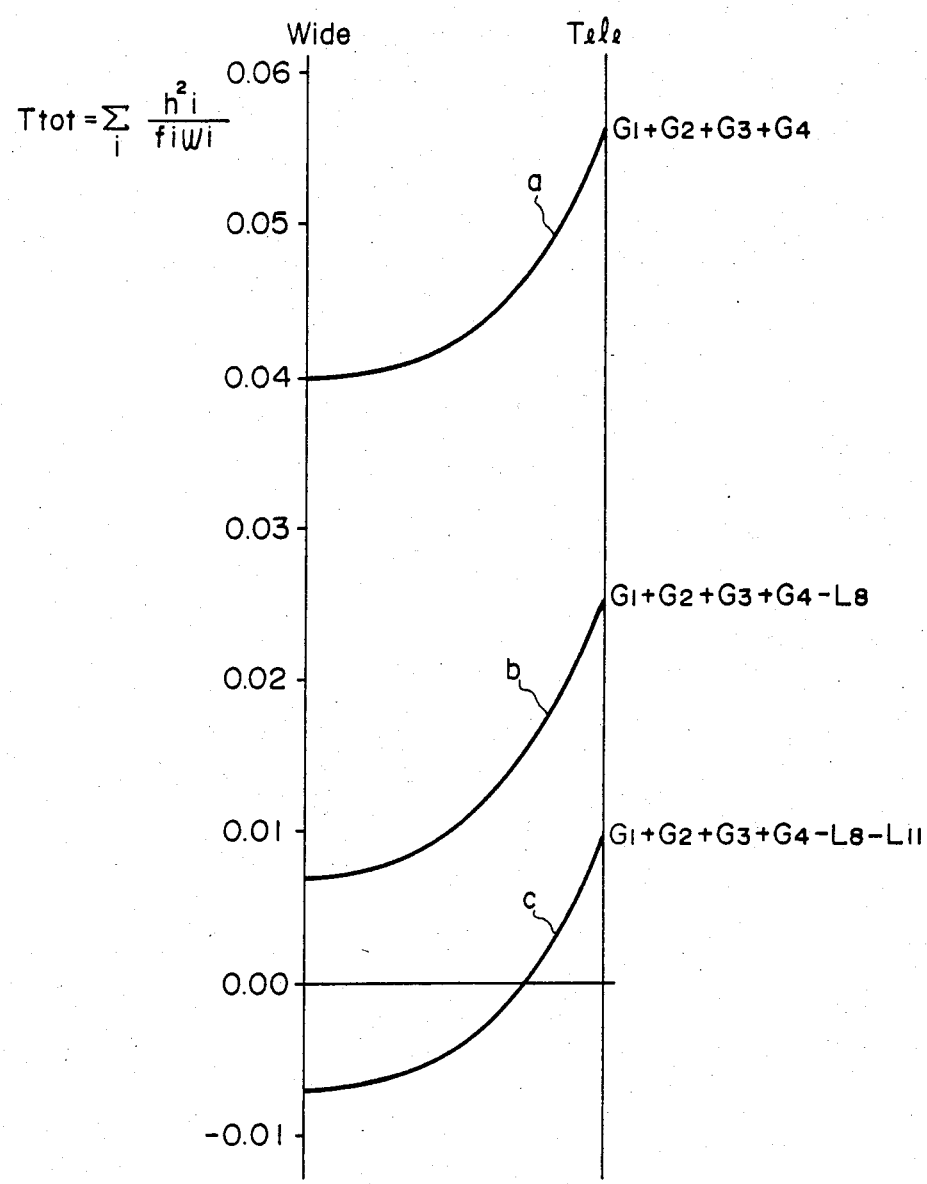
FIG. 30 shows the manner of the variation resulting from the change of the thermal aberration coefficient value with regard to the entire system.

The manner of the variation in the thermal aberration coefficient value of the entire system resulting from magnification change is shown in FIG. 30. In FIG. 30, the vertical axis represents the thermal aberration coefficient Ttot of the entire system, the horizontal axis represents the focal length of the entire system, the left end represents the shortest focal length condition (Wide), and the right end represents the longest focal length condition (Tele). In the figure, curve a shows the condition before correction, curve b shows the condition of the sixth embodiment, and curve c shows the condition of the seventh embodiment. As shown, in the seventh embodiment, the fluctuation component by magnification change is not eliminated but the absolute value thereof is considerably small and, as can be seen particularly from curve c, in the seventh embodiment, the aberration coefficient becomes zero in the course of magnification change and the absolute value of the aberration coefficient is corrected to a very small value over the entire magnification change range.

The light ray aberrations in the seventh embodiment are shown in FIG. 31, and the thermal aberrations in the seventh embodiment are shown in FIG. 32. The indications in these aberration graphs are similar to those in FIGS. 26 and 27 for the sixth embodiment, and the thermal aberrations before correction are as shown in FIG. 28. It is apparent from the comparison between these aberration graphs that the thermal aberrations as well as the light ray aberrations are practically sufficiently well corrected even for a temperature change from −10° C. to 50° C., and the effectiveness of the characteristic curves b and c of the thermal aberration coefficient is shown in FIG. 30.

As described above, according to the present invention, there can be achieved a zoom lens in which only one or several lens elements are formed of inorganic glass and all the other lens elements are formed of plastics (organic glass), whereby the thermal aberration inherent to organic glass is practically sufficiently well corrected over the entire magnification change range. This zoom lens is an excellent, very useful one which maintains numerous advantages of plastic lenses such as light weight, ease of manufacture, inexpensiveness, etc. and in which chromatic aberration as well as the aberrations for the standard light ray is practically sufficiently well corrected.

Various plastic materials are known as the organic glass used in the present invention, and plastic materials of relatively low dispersion include polymethyl-methacrylate (PMMA) and diethylene glycol bisallylcarbonate polymer widely used as CR-39 (registered trademark) in spectacle lenses, and plastic materials of relatively high dispersion include polystyrene (PS) and polycarbonate. Further, polyacrylonitrile, copolymer of acrylonitrile and styrene, copolymer of styrene and methylmethacrylate, etc. can be used as the lens material. Of course, the imaging performance can be improved by providing the lenses formed of these plastic materials with non-spherical surfaces. The inorganic glass forming one or several lenses for correcting the temperature aberration may be the usually used optical glass, and an optical glass having a suitable optical constant for correction of the light ray aberrations can be adopted.

I claim:

1. An athermalized zoom lens system comprising a plurality of lens groups, including movable lens groups capable of changing their relative position to vary the focal length;
at least one of said plurality of lens groups having at least one lens formed of inorganic glass, most of the lenses of said system being formed of organic glass;
said inorganic glass lens being such that when an organic glass lens is substituted therefor, the substituting organic glass lens creates, by zooming, an amount of focus variation substantially equal to a variation in focus created in the entire system by zooming, between predetermined temperatures, whereby the variation in focus position created in the entire system by zooming and resulting from a variation in temperature is corrected.

2. A zoom lens system according to claim 1, wherein said at least one inorganic glass lens is at least one positive lens.

3. A zoom lens system according to claim 1, wherein of said plurality of lens groups, the lens group forming a magnification changing system has said at least one inorganic glass lens.

4. A zoom lens system according to claim 3, wherein said magnification changing system comprises k lens elements and when said inorganic glass lens is the xth lens element from the object side, the temperature aberration coefficient $\Delta V_S$ created in the entire magnification changing system by zooming where an organic glass lens is substituted for said inorganic glass lens and the amount of variation $\Delta V_x$ in temperature aberration coefficient created in said substituting organic glass lens by zooming are substantially equal to each other and wherein $$\Delta V_S = \sum_{i=1}^{k} \left( \frac{h_i^{T2}}{f_i \omega_i} - \frac{h_i^{W2}}{f_i \omega_i} \right)$$

$$\Delta V_x = \frac{h_x^{T2}}{f_x \omega_x} - \frac{h_x^{W2}}{f_x \omega_x}$$

where $h_i^W$ is the height of a paraxial ray passing through each lens in the shortest focal length condition of the entire system, $h_i^T$ is the height of a paraxial ray passing through each lens in the longest focal length condition of the entire system, $f_i$ is the focal length of each lens, $\omega_i$ is the thermal dispersion number of the organic glass forming each lens, and the subscript i represents that it is the value of the ith lens element from the object side, and when $f_i$ is the focal length of the ith lens at a predetermined standard temperature t and $h_i$ is the height of incidence on the ith lens of a paraxial ray incident from the object side at a height f and $n_i(t)$ is the refractive index of the ith lens at said standard temperature t, the thermal dispersion number $\omega_i$ is defined as 8. A zoom lens system according to claim 7, wherein numerical data are as follows:

| Focal length f = 15~45, Zoom ratio 3, F-number 1.8 Image height y = 5.5 | | | | | | | | | |
|---|---|---|---|---|---|---|---|---|---|
| Radius of curvature | | Center thickness and air space | | Refractive index | | Abbe number | | Thermal dispersion number $\omega_i$ | |
| $r_1$ | 143.352 | $d_1$ | 1.0 | $n_1$ | 1.5914 | $\nu_1$ | 31.0 | $\omega_1$ | 77.3 $L_1$ ⎫ |
| $r_2$ | 29.984 | $d_2$ | 11.0 | $n_2$ | 1.4911 | $\nu_2$ | 56.6 | $\omega_2$ | 69.1 $L_2$ ⎬ $G_1$ |
| $r_3$ | −102.250 | $d_3$ | 0.1 | | | | | | |
| $r_4$ | 30.133 | $d_4$ | 6.0 | $n_3$ | 1.4911 | $\nu_3$ | 56.6 | $\omega_3$ | 69.1 $L_3$ ⎭ |
| $r_5$ | 220.269 | $d_5$ | variable | | | | | | |
| $r_6$ | 474.308 | $d_6$ | 1.0 | $n_4$ | 1.4911 | $\nu_4$ | 56.6 | $\omega_4$ | 69.1 $L_4$ ⎫ |
| $r_7$ | 13.889 | $d_7$ | 4.0 | | | | | | |
| $r_8$ | −28.403 | $d_8$ | 1.0 | $n_5$ | 1.4911 | $\nu_5$ | 56.6 | $\omega_5$ | 69.1 $L_5$ ⎬ $G_2$ |
| $r_9$ | 12.398 | $d_9$ | 0.5 | | | | | | |
| $r_{10}$ | 13.414 | $d_{10}$ | 3.0 | $n_6$ | 1.7552 | $\nu_6$ | 27.6 | $\omega_6$ | 0.0 $L_6$ ⎭ |
| $r_{11}$ | 28.697 | $d_{11}$ | variable | | | | | | |
| $r_{12}$ | 75.831 | $d_{12}$ | 2.2 | $n_7$ | 1.4911 | $\nu_7$ | 56.6 | $\omega_7$ | 69.1 $L_7$-$G_3$ |
| $r_{13}$ | −35.035 | $d_{13}$ | variable | | | | | | |
| $r_{14}$ | ∞ | $d_{14}$ | 7.5 | $n_8$ | 1.5750 | $\nu_8$ | 41.5 | $\omega_8$ | 0.0 Prism P |
| $r_{15}$ | ∞ | $d_{15}$ | 5.9 | | | | | | |
| $r_{16}$ | 11.209 | $d_{16}$ | 5.2 | $n_9$ | 1.5186 | $\nu_9$ | 70.1 | $\omega_9$ | 0.0 $L_8$ ⎫ |
| $r_{17}$ | −55.549 | $d_{17}$ | 2.13 | | | | | | |
| $r_{18}$ | −19.228 | $d_{18}$ | 4.8 | $n_{10}$ | 1.5914 | $\nu_{10}$ | 31.0 | $\omega_{10}$ | 77.3 $L_9$ ⎬ $G_4$ |
| $r_{19}$ | 9.657 | $d_{19}$ | 2.45 | | | | | | |
| $r_{20}$ | 36.745 | $d_{20}$ | 4.3 | $n_{11}$ | 1.4911 | $\nu_{11}$ | 56.6 | $\omega_{11}$ | 69.1 $L_{10}$ |
| $r_{21}$ | −29.730 | $d_{21}$ | 0.2 | | | | | | |
| $r_{22}$ | 14.651 | $d_{22}$ | 6.0 | $n_{12}$ | 1.4911 | $\nu_{12}$ | 56.6 | $\omega_{12}$ | 69.1 $L_{11}$ ⎭ |
| $r_{23}$ | −34.011 | $B_f$ | 12.235 | | | | | | |
| | | $f_W = 15$ | | | $f_M = 26$ | | | $f_T = 45$ | |
| | $d_5$ | 2.121 | | | 12.687 | | | 18.896 | |
| | $d_{11}$ | 19.309 | | | 12.856 | | | 1.874 | |
| | $d_{13}$ | 5.094 | | | 0.981 | | | 5.754 | |

$$\omega_i = \frac{n_i(t) - 1}{n_i(t_1) - n_i(t_2)}$$

for a predetermined temperature $t_1$ lower than said standard temperature t and a predetermined temperature $t_2$ higher than said standard temperature t.

5. A zoom lens system according to claim 4, wherein said magnification changing system has, in succession from the object side, a positive first group $G_1$ as a focusing group, a negative second group $G_2$ as a variator, and a positive third group $G_3$ as a compensator.

6. A zoom lens system according to claim 5, wherein said first group $G_1$ has a negative lens $L_1$ formed of polystyrene (PS), a positive lens $L_2$ of acryl (PMMA) cemented to said negative lens $L_1$, and a positive lens $L_3$ formed of acryl, said second group $G_2$ has a negative lens $L_4$ formed of acryl, a negative lens $L_5$ formed of acryl, and a positive lens $L_6$ formed of inorganic glass, and said third group $G_3$ has a positive lens $L_7$ formed of acryl.

7. A zoom lens system according to claim 6, further having a fourth group $G_4$ as a master system and wherein said fourth group $G_4$ has a positive lens $L_8$ formed of inorganic glass, a negative lens $L_9$ formed of polystyrene, and two positive lenses $L_{10}$ and $L_{11}$ formed of acryl.

where r represents the radius of curvature of each lens surface, d represents the center thickness and spacing of each lens, n and $\nu$ represent the refractive index and the Abbe number, respectively, of each lens for d-line ($\lambda$=587.6 nm), the respective subscript numbers represent the order from the object side, $f_W$, $f_M$ and $f_T$ represent the shortest, the intermediate and the longest focal length, respectively, of the entire system, and $B_f$ represents the back focal length.

9. A zoom lens system according to claim 4, wherein said first group $G_1$ has a negative lens $L_1$ formed of polystyrene, a positive lens $L_2$ formed of CR-39 (registered trademark) and cemented to said negative lens $L_1$, and a positive lens $L_3$ formed of acryl, said second group $G_2$ has two negative lenses $L_4$ and $L_5$ formed of CR-39, and a positive lens $L_6$ formed of inorganic glass, and said third group has a positive lens $L_7$ formed of acryl.

10. A zoom lens system according to claim 9, further having a fourth group $G_4$ as a master system and wherein said fourth group $G_4$ has a positive lens $L_8$ formed of inorganic glass, a negative lens $L_9$ formed of polystyrene, and two positive lenses $L_{10}$ and $L_{11}$ formed of CR-39.

11. A zoom lens system according to claim 10, wherein numerical data are as follows:

| Focal length f = 15~45, Zoom ratio 3, F-number 1.8 Image height y = 5.5 | | | | | | | | | |
|---|---|---|---|---|---|---|---|---|---|
| Radius of curvature | | Center thickness and air space | | Refractive index | | Abbe number | | Thermal dispersion number $\omega_i$ | |
| $r_1$ | 154.994 | $d_1$ | 1.0 | $n_1$ | 1.5914 | $\nu_1$ | 31.0 | $\omega_1$ | 77.3 $L_1$ ⎫ |
| $r_2$ | 30.139 | $d_2$ | 11.0 | $n_2$ | 1.4988 | $\nu_2$ | 61.5 | $\omega_2$ | 48.4 $L_2$ ⎬ $G_1$ |
| $r_3$ | −102.250 | $d_3$ | 0.1 | | | | | | |
| $r_4$ | 29.529 | $d_4$ | 6.0 | $n_3$ | 1.4911 | $\nu_3$ | 56.6 | $\omega_3$ | 69.1 $L_3$ ⎭ |
| $r_5$ | 185.427 | $d_5$ | variable | | | | | | |

-continued

| Focal length f = 15~45, Zoom ratio 3, F-number 1.8 Image height y = 5.5 | | | | | | | | | | | |
|---|---|---|---|---|---|---|---|---|---|---|---|
| $r_6$ | 107.699 | $d_6$ | 1.0 | $n_4$ | 1.4988 | $\nu_4$ | 61.5 | $\omega_4$ | 48.4 | $L_4$ | ⎫ |
| $r_7$ | 13.985 | $d_7$ | 4.0 | | | | | | | | |
| $r_8$ | −25.888 | $d_8$ | 1.0 | $n_5$ | 1.4988 | $\nu_5$ | 61.5 | $\omega_5$ | 48.4 | $L_5$ | ⎬ $G_2$ |
| $r_9$ | 12.398 | $d_9$ | 0.5 | | | | | | | | |
| $r_{10}$ | 13.384 | $d_{10}$ | 3.0 | $n_6$ | 1.7552 | $\nu_6$ | 27.6 | $\omega_6$ | 0.0 | $L_6$ | ⎭ |
| $r_{11}$ | 27.822 | $d_{11}$ | variable | | | | | | | | |
| $r_{12}$ | 75.831 | $d_{12}$ | 2.2 | $n_7$ | 1.4911 | $\nu_7$ | 56.6 | $\omega_7$ | 69.1 | $L_7$-$G_3$ | |
| $r_{13}$ | −35.034 | $d_{13}$ | variable | | | | | | | | |
| $r_{14}$ | ∞ | $d_{14}$ | 7.5 | $n_8$ | 1.5750 | $\nu_8$ | 41.5 | $\omega_8$ | 0.0 | Prism P | |
| $r_{15}$ | ∞ | $d_{15}$ | 5.9 | | | | | | | | |
| $r_{16}$ | 10.882 | $d_{16}$ | 5.2 | $n_9$ | 1.5186 | $\nu_9$ | 70.1 | $\omega_9$ | 0.0 | $L_8$ | ⎫ |
| $r_{17}$ | −66.021 | $d_{17}$ | 2.13 | | | | | | | | |
| $r_{18}$ | −19.171 | $d_{18}$ | 4.8 | $n_{10}$ | 1.5914 | $\nu_{10}$ | 31.0 | $\omega_{10}$ | 77.3 | $L_9$ | |
| $r_{19}$ | 9.355 | $d_{19}$ | 2.45 | | | | | | | | ⎬ $G_4$ |
| $r_{20}$ | 38.769 | $d_{20}$ | 4.3 | $n_{11}$ | 1.4988 | $\nu_{11}$ | 61.5 | $\omega_{11}$ | 48.4 | $L_{10}$ | |
| $r_{21}$ | −29.730 | $d_{21}$ | 0.2 | | | | | | | | |
| $r_{22}$ | 14.651 | $d_{22}$ | 6.0 | $n_{12}$ | 1.4988 | $\nu_{12}$ | 61.5 | $\omega_{12}$ | 48.4 | $L_{11}$ | ⎭ |
| $r_{23}$ | −32.052 | $B_f$ | 12.29 | | | | | | | | |

| | $f_W = 15$ | $f_M = 26$ | $f_T = 45$ |
|---|---|---|---|
| $d_5$ | 1.780 | 12.346 | 18.555 |
| $d_{11}$ | 19.596 | 13.143 | 2.161 |
| $d_{13}$ | 4.690 | 0.577 | 5.350 | where r represents the radius of curvature of each lens surface, d represents the center thickness and spacing of each lens, n and ν represent the refractive index and the Abbe number, respectively, of each lens for the d-line (λ=587.6 nm), the respective subscript numbers represent the order from the object side, $f_W$, $f_M$ and $f_T$ represent the shortest, the intermediate and the longest focal length, respectively, of the entire system, and $B_f$ represents the back focal length.

12. A zoom lens system according to claim 5, wherein said first group $G_1$ has a negative lens $L_1$ formed of polystyrene (PS), a positive lens $L_2$ formed of acryl (PMMA) and cemented to said negative lens $L_1$, and a positive lens $L_3$ formed of acryl, said second group $G_2$ has a negative lens $L_4$ formed of acryl, a negative lens $L_5$ of acryl and a positive lens $L_6$ of polystyrene cemented to said negative lens $L_5$, and said third group $G_3$ has a positive lens $L_7$ of acryl, a positive lens $L_8$ formed of inorganic glass, and a negative lens $L_9$ of polystyrene cemented to said positive lens $L_8$.

13. A zoom lens system accoridng to claim 12, further having a fourth group $G_4$ as a master system and wherein said fourth group $G_4$ has a negative lens $L_{10}$ of acryl, a positive lens $L_{11}$ of acryl, a positive lens $L_{12}$ of acryl and a negative lens $L_{13}$ of polystyrene cemented to said positive lens $L_{12}$.

14. A zoom lens system according to claim 13, wherein numerical data are as follows:

| Focal length f = 12.5~75, Zoom ratio 6, F-number 1.6 Image height y = 5.5 | | | | | | | | | | | |
|---|---|---|---|---|---|---|---|---|---|---|---|
| Radius of curvature | | Center thickness and air space | | Refractive index | | Abbe number | | Thermal dispersion number $\omega_j$ | | | |
| $r_1$ | 171.794 | $d_1$ | 1.4 | $n_1$ | 1.5914 | $\nu_1$ | 31.0 | $\omega_1$ | 77.3 | $L_1$ | ⎫ |
| $r_2$ | 44.763 | $d_2$ | 10.5 | $n_2$ | 1.4911 | $\nu_2$ | 56.6 | $\omega_2$ | 69.1 | $L_2$ | |
| $r_3$ | −166.580 | $d_3$ | 0.2 | | | | | | | | ⎬ $G_1$ |
| $r_4$ | 51.712 | $d_4$ | 5.0 | $n_3$ | 1.4911 | $\nu_3$ | 56.6 | $\omega_3$ | 69.1 | $L_3$ | ⎭ |
| $r_5$ | 524.796 | $d_5$ | variable | | | | | | | | |
| $r_6$ | 64.079 | $d_6$ | 1.0 | $n_4$ | 1.4911 | $\nu_4$ | 56.6 | $\omega_4$ | 69.1 | $L_4$ | ⎫ |
| $r_7$ | 18.833 | $d_7$ | 6.8 | | | | | | | | |
| $r_8$ | −31.706 | $d_8$ | 1.0 | $n_5$ | 1.4911 | $\nu_5$ | 56.6 | $\omega_5$ | 69.1 | $L_5$ | ⎬ $G_2$ |
| $r_9$ | 14.579 | $d_9$ | 3.5 | $n_6$ | 1.5914 | $\nu_6$ | 31.0 | $\omega_6$ | 77.3 | $L_6$ | ⎭ |
| $r_{10}$ | 31.257 | $d_{10}$ | variable | | | | | | | | |
| $r_{11}$ | 34.936 | $d_{11}$ | 5.0 | $n_7$ | 1.4911 | $\nu_7$ | 56.6 | $\omega_7$ | 69.1 | $L_7$ | ⎫ |
| $r_{12}$ | −35.182 | $d_{12}$ | 0.1 | | | | | | | | |
| $r_{13}$ | 19.512 | $d_{13}$ | 9.0 | $n_8$ | 1.5014 | $\nu_8$ | 56.6 | $\omega_8$ | 0.0 | $L_8$ | ⎬ $G_3$ |
| $r_{14}$ | −17.161 | $d_{14}$ | 1.0 | $n_9$ | 1.5914 | $\nu_9$ | 31.0 | $\omega_9$ | 77.3 | $L_9$ | ⎭ |
| $r_{15}$ | 57.128 | $d_{15}$ | variable | | | | | | | | |
| $r_{16}$ | −19.280 | $d_{16}$ | 1.0 | $n_{10}$ | 1.4911 | $\nu_{10}$ | 56.6 | $\omega_{10}$ | 69.1 | $L_{10}$ | ⎫ |
| $r_{17}$ | 11.647 | $d_{17}$ | 11.6 | | | | | | | | |
| $r_{18}$ | 108.097 | $d_{18}$ | 5.0 | $n_{11}$ | 1.4911 | $\nu_{11}$ | 56.6 | $\omega_{11}$ | 69.1 | $L_{11}$ | |
| $r_{19}$ | −14.194 | $d_{19}$ | 0.1 | | | | | | | | ⎬ $G_4$ |
| $r_{20}$ | 25.312 | $d_{20}$ | 7.0 | $n_{12}$ | 1.4911 | $\nu_{12}$ | 56.6 | $\omega_{12}$ | 69.1 | $L_{12}$ | |
| $r_{21}$ | −11.895 | $d_{21}$ | 1.0 | $n_{13}$ | 1.5914 | $\nu_{13}$ | 31.0 | $\omega_{13}$ | 77.3 | $L_{13}$ | ⎭ |
| $r_{22}$ | −88.022 | $B_f$ | 20.22 | | | | | | | | |

| | $f_W = 12.5$ | $f_M = 30.6$ | $f_T = 75$ |
|---|---|---|---|
| $d_5$ | 1.765 | 19.495 | 30.648 |
| $d_{10}$ | 44.910 | 21.485 | 1.625 |
| $d_{15}$ | 2.136 | 7.831 | 16.538 | where r represents the radius of curvature of each lens surface, d represents the center thickness and spacing of each lens, n and ν represent the refractive index and the Abbe number, respectively, of each lens for the d-line ($\lambda=587.6$ nm), the respective subscript numbers represent the order from the object side, $f_W$, $f_M$ and $f_T$ represent the shortest, the intermediate and the longest focal length, respectively, of the entire system, and $B_f$ represents the back focal length.

15. A zoom lens system according to claim 4, wherein said magnification changing system has, in succession from the object side, a positive first group $G_1$ as a focusing group, a negative second group $G_2$ as a variator, and a negative third group $G_3$ as a compensator, and said zoom lens system further has a fourth group $G_4$ as a master system.

16. A zoom lens system according to claim 15, wherein said first group $G_1$ has a negative lens $L_1$ of polystyrene (PS), a positive lens $L_2$ of acryl (PMMA) cemented to said negative lens $L_1$, and a positive lens $L_3$ of inorganic glass, said second group $G_2$ has a negative lens $L_4$ of acryl, a negative lens $L_5$ of acryl and a positive lens $L_6$ of polystyrene cemented to said negative lens $L_5$, and said third group $G_3$ has a negative lens $L_7$ of acryl.

17. A zoom lens system according to claim 16, wherein said fourth group $G_4$ has a positive lens $L_8$ of acryl, a positive lens $L_9$ of inorganic glass, a negative lens $L_{10}$ of polystyrene cemented to said positive lens $L_9$, a positive lens $L_{11}$ of acryl, a negative lens $L_{12}$ of polystyrene separated from said positive lens $L_{11}$ with a great air space therebetween, a positive lens $L_{13}$ of acryl cemented to said negative lens $L_{12}$, and a positive lens $L_{14}$ of acryl.

18. A zoom lens system according to claim 17, wherein numerical data are as follows:

sent the shortest, the intermediate and the longest focal length, respectively, of this entire system, and $B_f$ represents the back focal length.

19. A zoom lens system according to claim 3, wherein said magnification changing system comprises k lens elements and when it is assumed that a plurality of said inorganic glass lenses are included in said magnification changing system, where organic glass lenses are substituted for said plurality of inorganic glass lenses, the amount of variation $\Delta V_S$ in temperature aberration coefficient created in the entire magnification changing system by zooming and the sum of the amounts of variation $\Delta V_x$ in temperature aberration coefficient created in said substituting organic glass lenses by zooming are substantially equal to each other and wherein $$\Delta V_S = \sum_{i=1}^{k} \left( \frac{h_i^{T2}}{f_i \omega_i} - \frac{h_i^{W2}}{f_i \omega_i} \right)$$

$$\Delta V_x = \frac{h_x^{T2}}{f_x \omega_x} - \frac{h_x^{W2}}{f_x \omega_x}$$

where $h_i^W$ is the height of a paraxial ray passing through each lens in the shortest focal length condition of the entire system, $h_i^T$ is the height of a paraxial ray passing through each lens in the longest focal length condition of the entire system, $f_i$ is the focal length of each lens, $\omega_i$ is the thermal dispersion number of the organic glass forming each lens, and the subscript i represents that it is the value of the ith lens element from the object side, Focal length f = 11.5~69, Zoom ratio 6, F-number 1.6 Image height y = 5.5

| Radius of curvature | | Center thickness and air space | | Refractive index | | Abbe number | | Thermal dispersion number $\omega_i$ | | |
|---|---|---|---|---|---|---|---|---|---|---|
| $r_1$ | 145.120 | $d_1$ | 1.0 | $n_1$ | 1.5914 | $\nu_1$ | 31.0 | $\omega_1$ | 77.3 | $L_1$ |
| $r_2$ | 38.616 | $d_2$ | 14.0 | $n_2$ | 1.4911 | $\nu_2$ | 56.6 | $\omega_2$ | 69.1 | $L_2$ |
| $r_3$ | −95.884 | $d_3$ | 0.1 | | | | | | | |
| $r_4$ | 37.672 | $d_4$ | 4.5 | $n_3$ | 1.5186 | $\nu_3$ | 70.1 | $\omega_3$ | 0.0 | $L_3$ |
| $r_5$ | 94.187 | $d_5$ | variable | | | | | | | |
| $r_6$ | −86.661 | $d_6$ | 1.0 | $n_4$ | 1.4911 | $\nu_4$ | 56.6 | $\omega_4$ | 69.1 | $L_4$ |
| $r_7$ | 14.605 | $d_7$ | 4.5 | | | | | | | |
| $r_8$ | −33.050 | $d_8$ | 1.2 | $n_5$ | 1.4911 | $\nu_5$ | 56.6 | $\omega_5$ | 69.1 | $L_5$ |
| $r_9$ | 12.471 | $d_9$ | 2.8 | $n_6$ | 1.5914 | $\nu_6$ | 31.0 | $\omega_6$ | 77.3 | $L_6$ |
| $r_{10}$ | 61.485 | $d_{10}$ | variable | | | | | | | |
| $r_{11}$ | −15.790 | $d_{11}$ | 1.0 | $n_7$ | 1.4911 | $\nu_7$ | 56.6 | $\omega_7$ | 69.1 | $L_7$-$G_3$ |
| $r_{12}$ | −55.764 | $d_{12}$ | variable | | | | | | | |
| $r_{13}$ | −61.301 | $d_{13}$ | 2.84 | $n_8$ | 1.4911 | $\nu_8$ | 56.6 | $\omega_8$ | 69.1 | $L_8$ |
| $r_{14}$ | −23.745 | $d_{14}$ | 0.1 | | | | | | | |
| $r_{15}$ | 229.535 | $d_{15}$ | 7.77 | $n_9$ | 1.5014 | $\nu_9$ | 56.6 | $\omega_9$ | 0.0 | $L_9$ |
| $r_{16}$ | −14.609 | $d_{16}$ | 1.0 | $n_{10}$ | 1.5914 | $\nu_{10}$ | 31.0 | $\omega_{10}$ | 77.3 | $L_{10}$ |
| $r_{17}$ | −35.567 | $d_{17}$ | 0.09 | | | | | | | |
| $r_{18}$ | 31.960 | $d_{18}$ | 4.74 | $n_{11}$ | 1.4911 | $\nu_{11}$ | 56.6 | $\omega_{11}$ | 69.1 | $L_{11}$ |
| $r_{19}$ | −151.061 | $d_{19}$ | 27.274 | | | | | | | |
| $r_{20}$ | 38.343 | $d_{20}$ | 1.0 | $n_{12}$ | 1.5914 | $\nu_{12}$ | 31.0 | $\omega_{12}$ | 77.3 | $L_{12}$ |
| $r_{21}$ | 10.013 | $d_{21}$ | 6.06 | $n_{13}$ | 1.4911 | $\nu_{13}$ | 56.6 | $\omega_{13}$ | 69.1 | $L_{13}$ |
| $r_{22}$ | −124.764 | $d_{22}$ | 0.09 | | | | | | | |
| $r_{23}$ | 11.817 | $d_{23}$ | 2.0 | $n_{14}$ | 1.4911 | $\nu_{14}$ | 56.6 | $\omega_{14}$ | 69.1 | $L_{14}$ |
| $r_{24}$ | 15.829 | $B_f$ | 5.39 | | | | | | | |

| | $f_W = 11.5$ | $f_M = 28$ | $f_T = 69$ |
|---|---|---|---|
| $d_5$ | 2.785 | 23.156 | 35.787 |
| $d_{10}$ | 36.733 | 13.171 | 3.733 |
| $d_{12}$ | 3.419 | 6.610 | 3.418 | where r represents the radius of curvature of each lens surface, d represents the center thickness and spacing of each lens, n and $\nu$ represent the refractive index and the Abbe number, respectively, of each lens for the d-line ($\lambda=587.6$ nm), the respective subscript numbers represent the order from the object side, $f_W$, $f_M$ and $f_T$ represent and when $f_i$ is the focal length of the ith lens at a predetermined standard temperature t and $h_i$ is the height of incidence on the ith lens of a paraxial ray incident from the object side at a height f and $n_i(t)$ is the refractive index of the ith lens at said predetermined temperature t, the thermal dispersion number $\omega_i$ is defined as $$\omega_i = \frac{n_i(t) - 1}{n_i(t_1) - n_i(t_2)}$$

for a predetermined temperature $t_1$ lower than said standard temperature t and a predetermined temperature $t_2$ higher than said standard temperature t.

20. A zoom lens system according to claim 19, wherein said magnification changing system has, in succession from the object side, a divergent first lens group $G_1$ and a convergent second lens group $G_2$ movable relative to each other on the optical axis for zooming.

21. A zoom lens system according to claim 20, wherein said first group $G_1$ has a positive lens $L_1$ of acryl (PMMA), two negative lenses $L_2$ and $L_3$ of acryl, and a positive meniscus lens $L_4$ of polystyrene (PS), and said second group $G_2$ has a positive lens $L_5$ of inorganic glass, a negative lens $L_6$ of polystyrene cemented to said positive lens $L_5$, a positive lens $L_7$ of acryl, a positive meniscus lens $L_8$ of inorganic glass, a negative lens $L_9$ of inorganic glass and a positive lens $L_{10}$ of acryl.

22. A zoom lens system according to claim 21, wherein numerical data are as follows:

and positive lenses, and the lens which is most adjacent to the image side is formed of inorganic glass.

24. A zoom lens system according to claim 20, wherein said second lens group has, in succession from the object side, three continuous positive, negative and positive lenses, and the two positive lenses of said three continuous positive lenses are formed of inorganic glass.

25. A zoom lens system according to claim 1, wherein said plurality of lens groups comprise a magnification changing system lens group and a master system lens group which is stationary during magnification change, at least one positive lens in said master system lens group being said at least one inorganic glass lens, and said at least one inorganic glass lens being such that when an organic glass lens is substituted therefor, said substituting organic glass lens has an amount of focus variation corresponding to the direct current component of the focus variation created in said magnification changing system by zooming, between said predetermined temperatures.

26. A zoom lens system according to claim 25, wherein if it is assumed that said master system comprises u lenses, that the focal lengths of the respective lenses forming said master system are $f_1, f_2, \ldots, f_i, \ldots, f_u$, that the refractive indices of said respective lenses are $n_1, n_2, \ldots, n_i, \ldots, n_u$, that the thermal dispersion

| Focal length f = 35~70, Zoom ratio 2, F-number 3.5 Image height y = 21.6 | | | | | |
|---|---|---|---|---|---|
| Radius of curvature | Center thickness and air space | Refractive index | Abbe number | Thermal dispersion number $\omega_i$ | |
| $r_1$ 67.533 | $d_1$ 8.2 | $n_1$ 1.4911 | $\nu_1$ 57.6 | $\omega_1$ 69.1 | $L_1$ ⎫ |
| $r_2$ 293.759 | $d_2$ 0.7 | | | | |
| $r_3$ 140.240 | $d_3$ 1.5 | $n_2$ 1.4911 | $\nu_2$ 57.6 | $\omega_2$ 69.1 | $L_2$ |
| $r_4$ 22.775 | $d_4$ 7.0 | | | | $G_1$ |
| $r_5$ −175.452 | $d_5$ 1.5 | $n_3$ 1.4911 | $\nu_3$ 57.6 | $\omega_3$ 69.1 | $L_3$ |
| $r_6$ 32.226 | $d_6$ 5.7 | | | | |
| $r_7$ 33.139 | $d_7$ 3.9 | $n_4$ 1.5914 | $\nu_4$ 31.0 | $\omega_4$ 77.3 | $L_4$ ⎭ |
| $r_8$ 89.304 | $d_8$ variable | | | | |
| $r_9$ 49.613 | $d_9$ 6.5 | $n_5$ 1.5014 | $\nu_5$ 56.5 | $\omega_5$ 0.0 | $L_5$ ⎫ |
| $r_{10}$ −28.258 | $d_{10}$ 1.0 | $n_6$ 1.5914 | $\nu_6$ 31.0 | $\omega_6$ 77.3 | $L_6$ |
| $r_{11}$ −123.425 | $d_{11}$ 0.1 | | | | |
| $r_{12}$ 30.907 | $d_{12}$ 3.5 | $n_7$ 1.4911 | $\nu_7$ 57.6 | $\omega_7$ 69.1 | $L_7$ |
| $r_{13}$ 188.671 | $d_{13}$ 0.1 | | | | |
| $r_{14}$ 22.455 | $d_{14}$ 2.5 | $n_8$ 1.6583 | $\nu_8$ 57.3 | $\omega_8$ 0.0 | $L_8$ $G_2$ |
| $r_{15}$ 39.238 | $d_{15}$ 4.0 | | | | |
| $r_{16}$ 209.734 | $d_{16}$ 1.0 | $n_9$ 1.7234 | $\nu_9$ 38.0 | $\omega_9$ 0.0 | $L_9$ |
| $r_{17}$ 18.146 | $d_{17}$ 5.2 | | | | |
| $r_{18}$ 106.970 | $d_{18}$ 3.8 | $n_{10}$ 1.4911 | $\nu_{10}$ 57.6 | $\omega_{10}$ 69.1 | $L_{10}$ ⎭ |
| $r_{19}$ −35.294 | $B_f$ variable | | | | |
| | $f_W = 35$ | | $f_M = 51$ | | $f_T = 70$ |
| $d_8$ | 34.338 | | 15.595 | | 1.538 |
| $B_f$ | 38.465 | | 57.208 | | 71.265 | where r represents the radius of curvature of each lens surface, d represents the center thickness and spacing of each lens, n and ν represent the refractive index and the Abbe number, respectively, of each lens for the d-line (λ=587.6 nm), the respective subscript numbers represent the order from the object side, $f_W$, $f_M$ and $f_T$ represent the shortest, the intermediate and the longest focal length, respectively, of the entire system, and $B_f$ represents the back focal length.

23. A zoom lens system according to claim 20, wherein said first lens group has, in succession from the object side, a positive lens $L_1$, a negative meniscus lens $L_2$, a negative lens $L_3$ and a positive lens $L_4$, said positive lens $L_4$ which is most adjacent to the image side is formed of inorganic glass, said second lens group has, in succession from the object side, three positive, negative numbers of said respective lenses are $\omega_1, \omega_2, \ldots, \omega_i, \ldots, \omega_u$ and that the heights of paraxial rays in said respective lenses are $h_1, h_2, \ldots, h_i, \ldots, h_u$, then the temperature aberration coefficient Tm of said master system is defined as $$\sum_{i=1}^{u} \frac{h_i^2}{f_i \omega_i} = Tm,$$

and the temperature aberration coefficient Tm of the master system, the temperature aberration coefficient Ttot(W) of the entire system in the shortest focal length condition and the temperature aberration coefficient Ttot(T) of the entire system in the longest focal length condition are respectively defined as $$Ttot(W) = \sum_{i=1}^{k} \frac{h_i^{W2}}{f_{i\omega_i}}$$

$$Ttot(T) = \sum_{i=1}^{k} \frac{h_i^{T2}}{f_{i\omega_i}}$$

and satisfy the following conditions:

$-0.02 \leq Tm \leq 0.01$ $|Ttot(W)| \geq 0.01$ $0.005 \leq Ttot(T) \leq 0.03$ where $h_i^W$ is the height of a paraxial ray passing through each lens in the shortest focal length condition of the entire system, $h_i^T$ is the height of a paraxial ray passing through each lens in the longest focal length condition of the entire system, $f_i$ is the focal length of each lens, $\omega_i$ is the thermal dispersion number of the organic glass forming each lens, and the subscript i represents that it is the value of the ith lens element from the object side, and when $f_i$ is the focal length of the ith lens at a predetermined standard temperature t and $h_i$ is the height of incidence on the ith lens of a paraxial ray incident from the object side at a height f and $n_i(t)$ is the refractive index of the ith lens at said standard temperature t, the thermal dispersion number $\omega_i$ is defined as $$\omega_i = \frac{n_i(t) - 1}{n_i(t_1) - n_i(t_2)}$$

for a predetermined temperature $t_1$ lower than said standard temperature t and a predetermined temperature $t_2$ higher than said standard temperature t.

27. A zoom lens system according to claim 26, wherein said magnification changing system has, in succession from the object side, a positive first group $G_1$ as a focusing group, a negative second group $G_2$ as a variator, and a positive third group $G_3$ as a compensator, and said master system comprises a positive fourth group $G_4$.

28. A zoom lens system according to claim 27, wherein said first group $G_1$ has a negative lens $L_1$ formed of polystyrene (PS), a positive lens $L_2$ of acryl (PMMA) cemented to said negative lens $L_1$, and a positive lens $L_3$ formed of acryl, said second group $G_2$ has a negative lens $L_4$ formed of acryl, a negative lens $L_5$ formed of acryl, and a positive lens $L_6$ of polystyrene cemented to said negative lens $L_5$, said third group $G_3$ has a positive lens $L_7$ formed of acryl, and said fourth group $G_4$ which is the master system has a positive lens $L_8$ formed of inorganic glass, a negative lens $L_9$ formed of polystyrene, and two positive lenses $L_{10}$ and $L_{11}$ formed of acryl.

29. A zoom lens system according to claim 28, wherein numerical data are as follows:

| Focal length f = 15~45, Zoom ratio 3, F-number 1.8 Image height y = 5.5 | | | | | |
|---|---|---|---|---|---|
| Radius of curvature | Center thickness and air space | Refractive index | Abbe number | Thermal dispersion factor $\omega_i$ | |
| $r_1$ 126.5 | $d_1$ 1.0 | $n_1$ 1.5914 | $\nu_1$ 31.0 | $\omega_1$ 77.3 | $L_1$ ⎫ |
| $r_2$ 28.37 | $d_2$ 10.5 | $n_2$ 1.4911 | $\nu_2$ 56.6 | $\omega_2$ 69.1 | $L_2$  $G_1$ |
| $r_3$ −121.659 | $d_3$ 0.1 | | | | |
| $r_4$ 30.654 | $d_4$ 6.3 | $n_3$ 1.4911 | $\nu_3$ 56.6 | $\omega_3$ 69.1 | $L_3$ ⎭ |
| $r_5$ 473.205 | $d_5$ variable | | | | |
| $r_6$ −627.475 | $d_6$ 1.0 | $n_4$ 1.4911 | $\nu_4$ 56.6 | $\omega_4$ 69.1 | $L_4$ ⎫ |
| $r_7$ 11.685 | $d_7$ 4.0 | | | | |
| $r_8$ −24.512 | $d_8$ 1.0 | $n_5$ 1.4911 | $\nu_5$ 56.6 | $\omega_5$ 69.1 | $L_5$  $G_2$ |
| $r_9$ 11.559 | $d_9$ 3.5 | $n_6$ 1.5914 | $\nu_6$ 31.0 | $\omega_6$ 77.3 | $L_6$ ⎭ |
| $r_{10}$ 85.329 | $d_{10}$ variable | | | | |
| $r_{11}$ 51.959 | $d_{11}$ 2.2 | $n_7$ 1.4911 | $\nu_7$ 56.6 | $\omega_7$ 69.1 | $L_7$-$G_3$ |
| $r_{12}$ −44.546 | $d_{12}$ variable | | | | |
| $r_{13}$ 10.854 | $d_{13}$ 11.3 | $n_8$ 1.4978 | $\nu_8$ 82.3 | $\omega_8$ 0.0 | $L_8$ ⎫ |
| $r_{14}$ −139.132 | $d_{14}$ 2.13 | | | | |
| $r_{15}$ −21.792 | $d_{15}$ 4.8 | $n_9$ 1.5914 | $\nu_9$ 31.0 | $\omega_9$ 77.3 | $L_9$  $G_4$ |
| $r_{16}$ 9.605 | $d_{16}$ 2.45 | | | | |
| $r_{17}$ 34.579 | $d_{17}$ 4.3 | $n_{10}$ 1.4911 | $\nu_{10}$ 56.6 | $\omega_{10}$ 69.1 | $L_{10}$ |
| $r_{18}$ −29.492 | $d_{18}$ 0.2 | | | | |
| $r_{19}$ 14.981 | $d_{19}$ 6.0 | $n_{11}$ 1.4911 | $\nu_{11}$ 56.6 | $\omega_{11}$ 69.1 | $L_{11}$ ⎭ |
| $r_{20}$ −32.857 | | | | | |
| | $f_W$ = 15.06 | | $f_M$ = 25.64 | | $f_T$ = 43.63 |
| | $d_5$ 1.8375 | | 12.4237 | | 18.6442 |
| | $d_{10}$ 18.6068 | | 12.1419 | | 1.1399 |
| | $d_{12}$ 8.8983 | | 4.7770 | | 9.5584 |
| | | $B_f$ = 13.64 | | | | where r represents the radius of curvature of each lens surface, d represents the center thickness and spacing of each lens, n and $\nu$ represent the refractive index and the Abbe number, respectively, of each lens for the d-line ($\lambda$=587.6 nm), the respective subscript numbers represent the order from the object side, $f_W$, $f_M$ and $f_T$ represent the shortest, the intermediate and the longest focal length, respectively, of the entire system, and $B_f$ represents the back focal length.

30. A zoom lens system according to claim 29, wherein said first group $G_1$ has a negative lens $L_1$ formed of polystyrene (PS), a positive lens $L_2$ of acryl (PMMA) cemented to said negative lens $L_1$, and a positive lens $L_3$ formed of acryl, said second group $G_2$ has a negative lens $L_4$ formed of acryl, a negative lens $L_5$ formed of acryl, and a positive lens $L_6$ of polystyrene cemented to said negative lens $L_5$, said third group $G_3$ has a positive lens $L_7$ formed of acryl, and said fourth group $G_4$ has a positive lens $L_8$ formed of inorganic glass, a negative lens $L_9$ formed of polystyrene, a positive lens $L_{10}$ formed of acryl, and a positive lens $L_{11}$ formed of inorganic glass.

31. A zoom lens system according to claim 30, wherein numerical data are as follows:

| Focal length F = 15~45, Zoom ratio 3, F-number 1.8 Image height y = 5.5 | | | | | | |
|---|---|---|---|---|---|---|
| Radius of curvature | Center thickness and air space | Refractive index | Abbe number | Thermal dispersion factor $\omega_l$ | | |
| $r_1$ 126.5 | $d_1$ 1.0 | $n_1$ 1.5914 | $\nu_1$ 31.0 | $\omega_1$ 77.3 | $L_1$ | |
| $r_2$ 28.37 | $d_2$ 10.5 | $n_2$ 1.4911 | $\nu_2$ 56.6 | $\omega_2$ 69.1 | $L_2$ | |
| $r_3$ −121.659 | $d_3$ 0.1 | | | | | $G_1$ |
| $r_4$ 30.654 | $d_4$ 6.3 | $n_3$ 1.4911 | $\nu_3$ 56.6 | $\omega_3$ 69.1 | $L_3$ | |
| $r_5$ 473.206 | $d_5$ variable | | | | | |
| $r_6$ −627.475 | $d_6$ 1.0 | $n_4$ 1.4911 | $\nu_4$ 56.6 | $\omega_4$ 69.1 | $L_4$ | |
| $r_7$ 11.685 | $d_7$ 4.0 | | | | | |
| $r_8$ −24.512 | $d_8$ 1.0 | $n_5$ 1.4911 | $\nu_5$ 56.6 | $\omega_5$ 69.1 | $L_5$ | $G_2$ |
| $r_9$ 11.56 | $d_9$ 3.5 | $n_6$ 1.5914 | $\nu_6$ 31.0 | $\omega_6$ 77.3 | $L_6$ | |
| $r_{10}$ 85.329 | $d_{10}$ variable | | | | | |
| $r_{11}$ 51.959 | $d_{11}$ 2.2 | $n_7$ 1.4911 | $\nu_7$ 56.6 | $\omega_7$ 69.1 | $L_7$-$G_3$ | |
| $r_{12}$ −44.546 | $d_{12}$ variable | | | | | |
| $r_{13}$ 10.854 | $d_{13}$ 5.2 | $n_8$ 1.4978 | $\nu_8$ 82.3 | $\omega_8$ 0.0 | $L_8$ | |
| $r_{14}$ −139.132 | $d_{14}$ 2.13 | | | | | |
| $r_{15}$ −21.792 | $d_{15}$ 4.8 | $n_9$ 1.5914 | $\nu_9$ 31.0 | $\omega_9$ 77.3 | $L_9$ | |
| $r_{16}$ 9.605 | $d_{16}$ 2.45 | | | | | $G_4$ |
| $r_{17}$ 34.579 | $d_{17}$ 4.3 | $n_{10}$ 1.4911 | $\nu_{10}$ 56.6 | $\omega_{10}$ 69.1 | $L_{10}$ | |
| $r_{18}$ −29.492 | $d_{18}$ 0.2 | | | | | |
| $r_{19}$ 14.981 | $d_{19}$ 6.0 | $n_{11}$ 1.5014 | $\nu_{11}$ 56.6 | $\omega_{11}$ 0.0 | $L_{11}$ | |
| $r_{20}$ −32.857 | | | | | | |
| | $f_W = 15.06$ | | $f_M = 25.64$ | | $f_T = 43.63$ | |
| | $d_5$ 1.8375 | | 12.4237 | | 18.6442 | |
| | $d_{10}$ 18.6068 | | 12.1419 | | 1.1399 | |
| | $d_{12}$ 8.8983 | | 4.7770 | | 9.5584 | |
| | | $B_f = 13.64$ | | | | | where r represents the radius of curvature of each lens surface, d represents the center thickness and spacing of each lens, n and $\nu$ represent the refractive index and the Abbe number, respectively, of each lens for the d-line ($\lambda = 587.6$ nm), the respective subscript numbers represent the order from the object side, $f_W$, $f_M$ and $f_T$ represent the shortest, the intermediate and the longest focal length, respectively, of the entire system, and $B_f$ represents the back focal length.

* * * * *